(12) United States Patent
Arrasvuori et al.

(10) Patent No.: US 9,235,268 B2
(45) Date of Patent: *Jan. 12, 2016

(54) METHOD AND APPARATUS FOR GENERATING A VIRTUAL INTERACTIVE WORKSPACE

(75) Inventors: Juha Henrik Arrasvuori, Tampere (FI); Jaakko Keränen, Tampere (FI); Hannu J. Korhonen, Kangasala (FI); Andrés Lucero, Tampere (FI); Tero Jokela, Tampere (FI); Marion Boberg, Suinula (FI); Jussi Pekka Holopainen, Tampere (FI); Erika Piia Pauliina Reponen, Tampere (FI); Kaisa Väänänen-Vainio-Mattila, Pirkkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 485 days.

This patent is subject to a terminal disclaimer.

(21) Appl. No.: 12/913,549

(22) Filed: Oct. 27, 2010

(65) Prior Publication Data

US 2011/0249024 A1   Oct. 13, 2011

Related U.S. Application Data

(63) Continuation-in-part of application No. 12/757,754, filed on Apr. 9, 2010.

(51) Int. Cl.
*G06F 15/16* (2006.01)
*G06F 3/01* (2006.01)
*G06F 3/14* (2006.01)

(52) U.S. Cl.
CPC .............. *G06F 3/017* (2013.01); *G06F 3/1454* (2013.01); *G09G 2354/00* (2013.01); *G09G 2356/00* (2013.01)

(58) Field of Classification Search
CPC ....... G06F 1/1613; G06F 3/1454; G06F 3/01; G06F 3/018; G06F 3/0481; G06F 3/0487; G06F 3/017; G06F 3/0486; G06F 3/04886; G06F 13/00; G06F 21/84; G06F 21/85; G09G 5/363; G09G 5/003; G09G 5/37; G09G 5/38
USPC ........... 709/217, 200; 345/629, 440; 715/863, 715/716

See application file for complete search history.

(56) References Cited

U.S. PATENT DOCUMENTS

| 6,603,494 B1 | 8/2003 | Banks et al. |
| 6,757,531 B1 | 6/2004 | Haaramo et al. |

(Continued)

FOREIGN PATENT DOCUMENTS

| EP | 1 816 551 A2 | 8/2007 |
| EP | 1 851 596 A2 | 11/2007 |

(Continued)

OTHER PUBLICATIONS

U.S. Appl. No. 12/756,796, filed Apr. 8, 2010, Keranen et al.
U.S. Appl. No. 12/757,754, filed Apr. 9, 2010, Juha Henrik Arrasvuori et al.

(Continued)

*Primary Examiner* — Thuong Nguyen
(74) *Attorney, Agent, or Firm* — Ditthavong & Steiner, P.C.

(57) ABSTRACT

An approach is provided for creating a virtual workspace among devices based, at least in part, on location information. The virtual workspace corresponds to an application or a service common to the devices. Monitoring of the movement of one or more of the devices causes manipulation of the virtual workspace, the application, the service, or a combination thereof based, at least in part, on the movement. Example applications and services include media editing, media playback, image processing, social networking, and social control functionality.

20 Claims, 26 Drawing Sheets

(56) References Cited

U.S. PATENT DOCUMENTS

| | | |
|---|---|---|
| 7,188,153 B2 | 3/2007 | Lunt et al. |
| 7,478,078 B2 | 1/2009 | Lunt et al. |
| 7,532,196 B2 | 5/2009 | Hinckley |
| 7,986,917 B2 | 7/2011 | Ahlgren et al. |
| 8,276,080 B2 * | 9/2012 | Tatsubori .................. 715/751 |
| 2002/0054172 A1 * | 5/2002 | Berman et al. ............. 345/856 |
| 2004/0236818 A1 * | 11/2004 | Bantz et al. ................ 709/200 |
| 2005/0093868 A1 | 5/2005 | Hinckley |
| 2005/0265535 A1 * | 12/2005 | Kanada ................. 379/202.01 |
| 2005/0286546 A1 | 12/2005 | Bassoli et al. |
| 2006/0105838 A1 * | 5/2006 | Mullen ......................... 463/31 |
| 2006/0116164 A1 | 6/2006 | Kang |
| 2006/0146765 A1 * | 7/2006 | Van De Sluis et al. ....... 370/338 |
| 2006/0154713 A1 * | 7/2006 | Sunazuka et al. ................ 463/6 |
| 2006/0170958 A1 * | 8/2006 | Jung et al. .................... 358/1.15 |
| 2007/0233759 A1 * | 10/2007 | Tomlinson et al. ........... 708/200 |
| 2008/0216125 A1 | 9/2008 | Li et al. |
| 2008/0318633 A1 | 12/2008 | Wong et al. |
| 2009/0132931 A1 * | 5/2009 | Tatsubori .................. 715/752 |
| 2009/0182813 A1 | 7/2009 | McCartie et al. |
| 2009/0193474 A1 | 7/2009 | Stein |
| 2009/0210808 A1 * | 8/2009 | West ............................ 715/764 |
| 2009/0273560 A1 | 11/2009 | Kalanithi et al. |
| 2010/0082136 A1 * | 4/2010 | Rosenblatt et al. ............. 700/94 |
| 2010/0095251 A1 | 4/2010 | Dunko |
| 2010/0125633 A1 * | 5/2010 | Chatani ........................ 709/205 |
| 2010/0125816 A1 | 5/2010 | Bezos |
| 2010/0174421 A1 | 7/2010 | Tsai et al. |
| 2010/0182436 A1 * | 7/2010 | Boman et al. ............. 348/207.1 |
| 2010/0238188 A1 * | 9/2010 | Miceli .......................... 345/582 |
| 2010/0275136 A1 * | 10/2010 | Gower ......................... 715/757 |
| 2010/0287485 A1 * | 11/2010 | Bertolami et al. ............ 715/764 |
| 2010/0332589 A1 * | 12/2010 | Schwimer .................... 709/203 |
| 2011/0067080 A1 * | 3/2011 | Riha ............................ 725/110 |
| 2011/0106912 A1 * | 5/2011 | Onda et al. ................... 709/217 |
| 2011/0238755 A1 | 9/2011 | Khan et al. |
| 2011/0252320 A1 * | 10/2011 | Arrasvuori et al. ........... 715/704 |
| 2011/0273470 A1 * | 11/2011 | Ohba et al. ................... 345/619 |
| 2012/0179672 A1 * | 7/2012 | Van Wie et al. .............. 707/723 |

FOREIGN PATENT DOCUMENTS

| | | |
|---|---|---|
| WO | WO 99/01838 A2 | 1/1999 |
| WO | WO 2006/083416 A2 | 8/2006 |

OTHER PUBLICATIONS

ConnecTables: Dynamic Coupling of Displays for the Flexible Creation of Shared Workspaces, Tandler et Proceedings of the 14. Annual ACM Symposium on User Interface Software and Technolo (UIST'01), ACM Press (CHI Letters 3 (2)), 2001. pp. 11-20.

http://sifteo.com/. Accessed: Jun. 7, 2010, pp. 1.

Manipulating and Annotating Slides in a Multi-Display Environment (Abstract), Chiu, et al., 2003. Accessed: http://en.scientificcommons.org/43339465 pp. 1-2.

Perspective Cursor: Perspective-Based Interaction for Multi-Display Environments, Nacenta et al., CHI 2006 Proceedings, Multidisplay Environments, Apr. 22-27, 2006, Montréal, Québec, Canada, pp. 289-298.

Scent Field Trial—Understanding Emerging Social Interaction, Jung et al. MobileHCI'06, Sep. 12-15, 2006, Helsinki, Finland, pp. 69-76.

Stitching: Pen Gestures that Span Multiple Displays; Hinckley et al., ACM Int'l Working Conf. on Advanced Visual Interfaces, May 25-28, 2004, pp. 1-9.

Welcome to a Cube World, MFEREDAY, Aug. 19, 2006, http://www.gadgetspeak.com/gadget/article.rhtm/751/337391/article.html, pp. 1-2.

Welcome to Radica Games!. Accessed: Jun. 9, 2010, http://web.archive.org/web/20080420055735/www.radicagames.com/site.php?m=radica, pp. 1.

Synchronous Gestures in Multi-Display Environment, Ramos et al., Human-Computer Interaction, 2009, vol. 24, pp. 117-169.

Office Action for related U.S. Appl. No. 12/757,754 dated May 24, 2012, pp. 1-43.

Chetan et al., "Mobile Gaia: A Middleware for Ad-hoc Pervasive Computing," IEEE Consumer Communications and Networking Conference, Mar. 2004, pp. 223-228.

International Search Report for corresponding PCT Application No. PCT/FI2011/050290, Jul. 18, 2011, pp. 1-6.

Schulzrinne et al., "Ubiquitous Computing in Home Networks," IEEE Communications Magazine, Nov. 2003, pp. 128-135.

Syukur et al., "Hanging Services: An Investigation of Context-Sensitivity and Mobile Code for Localised Services," IEEE International Conference on Mobile Data Management, Jan. 19, 2004, pp. 1-12.

Written Opinion for corresponding PCT Application No. PCT/FI2011/050290, Jul. 18, 2011, pp. 1-7.

Final Rejection for related U.S. Appl. No. 12/757,754 dated Oct. 26, 2012, pp. 1-40.

* cited by examiner

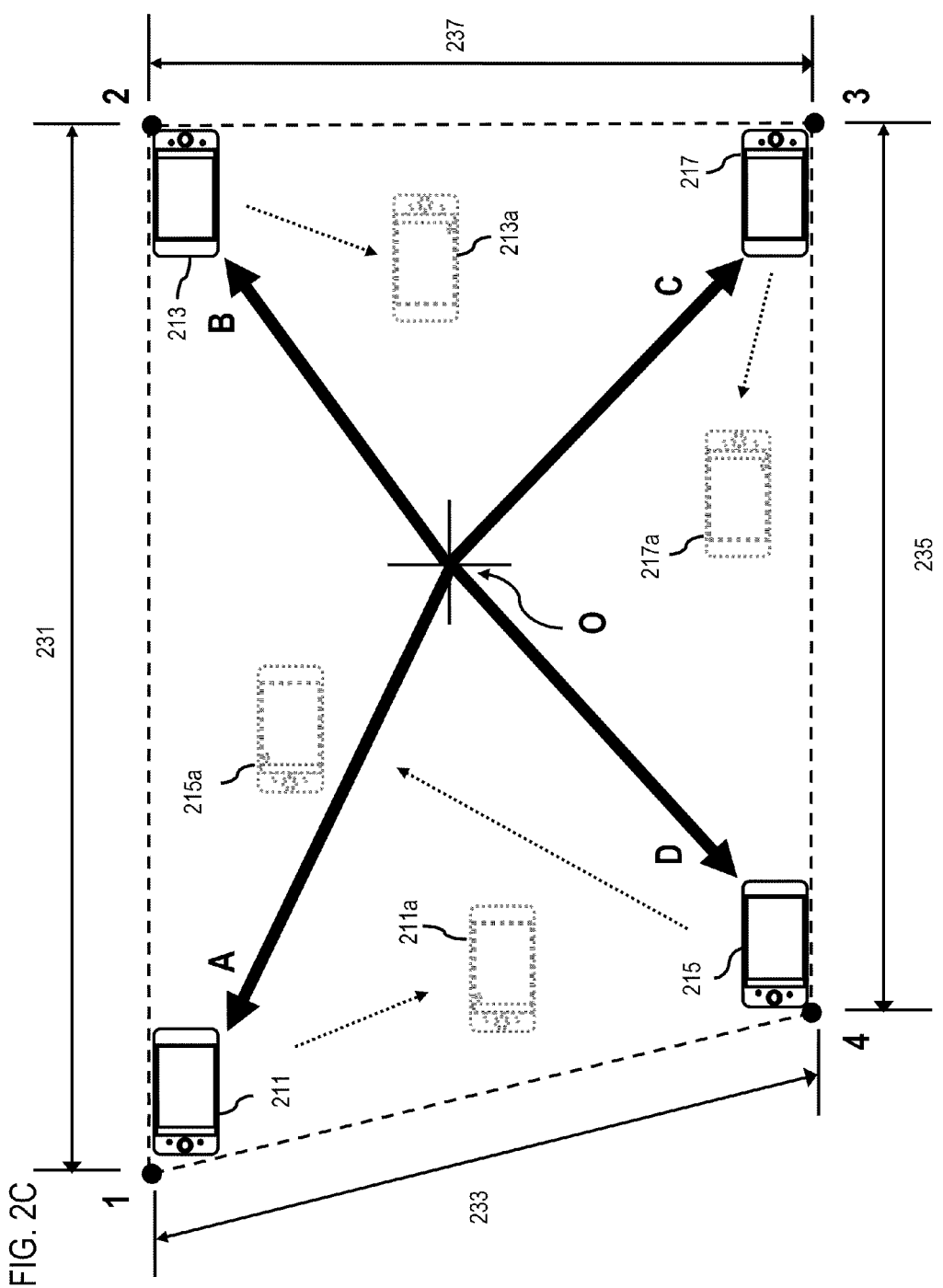

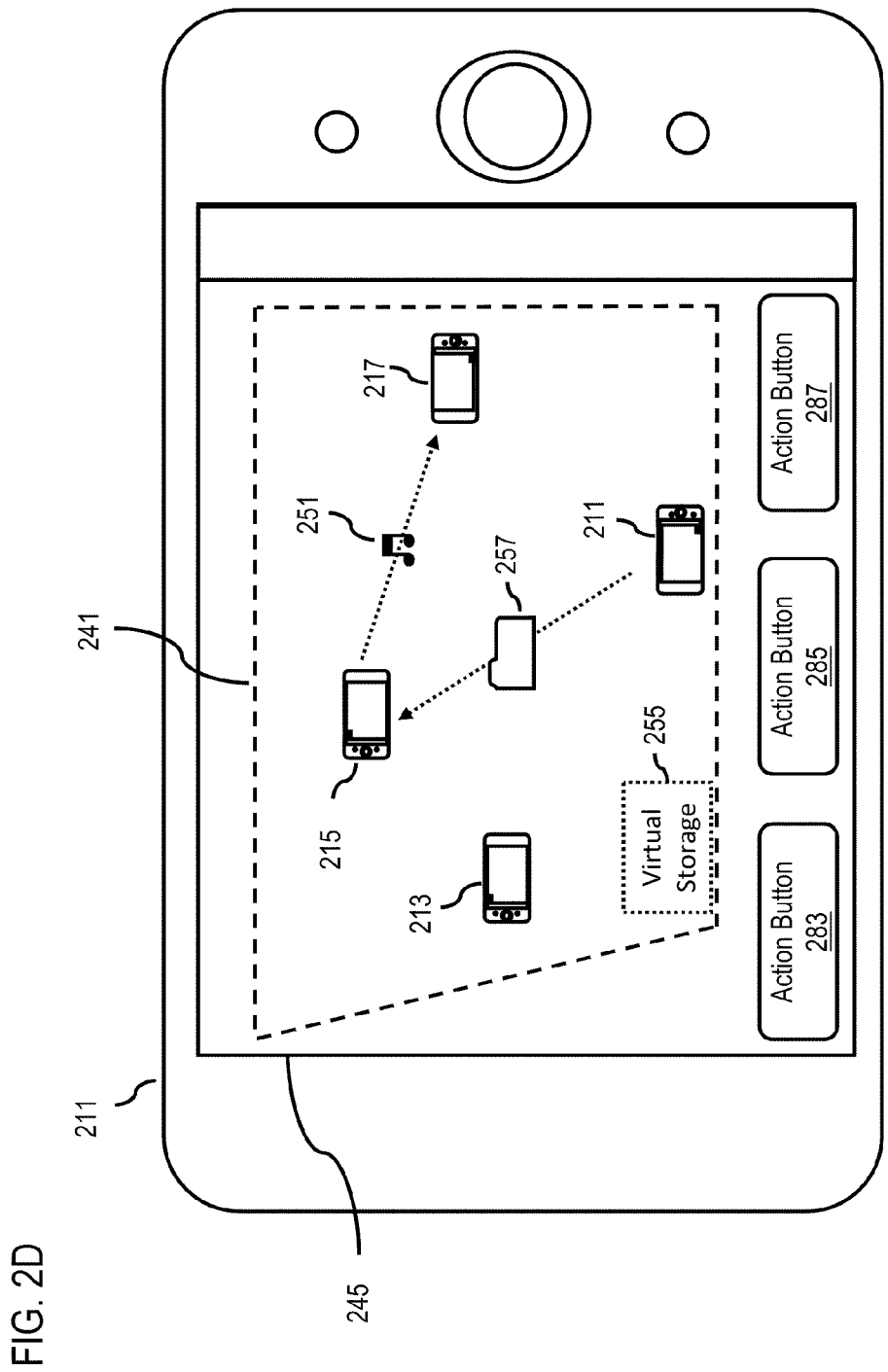

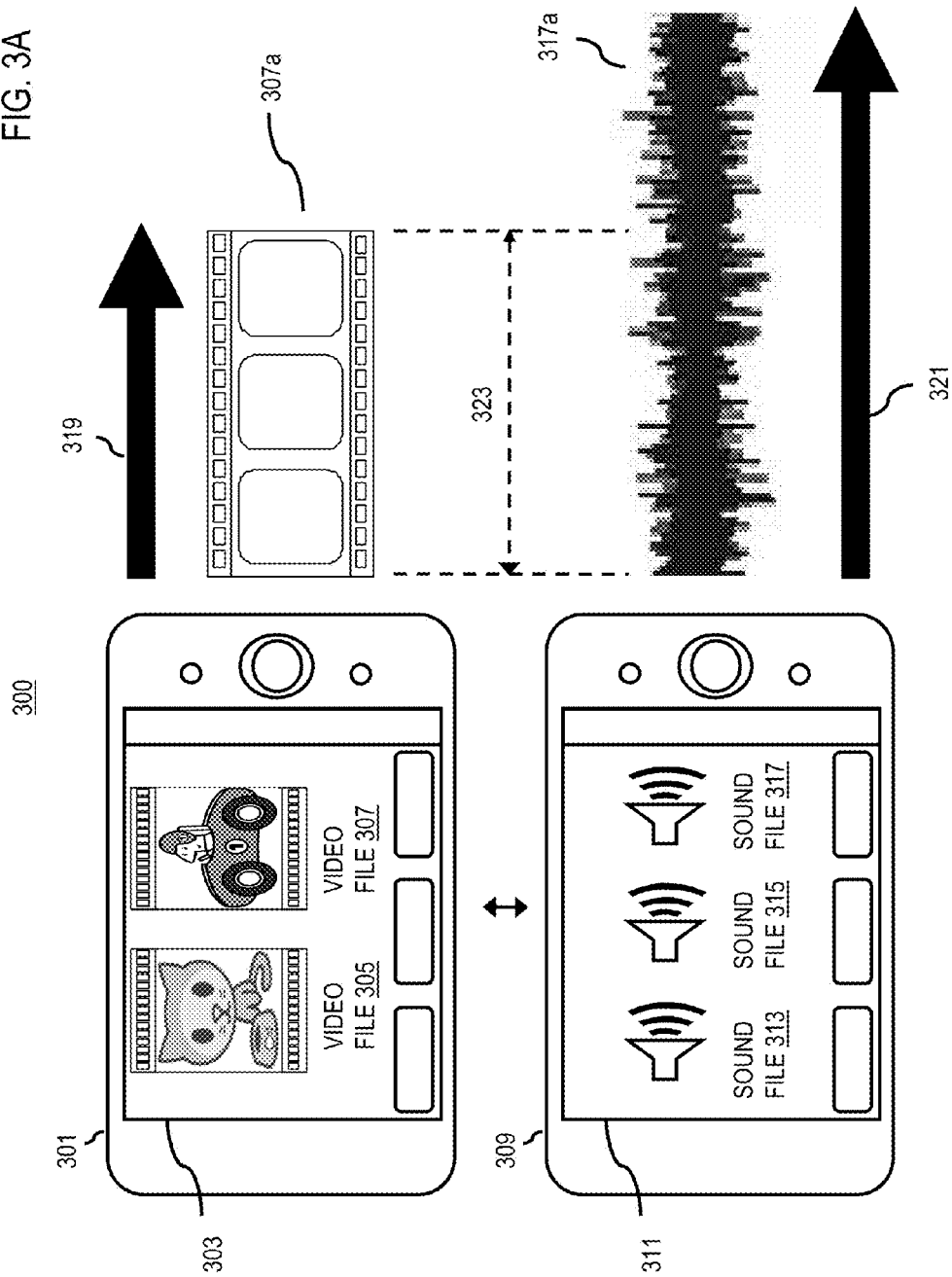

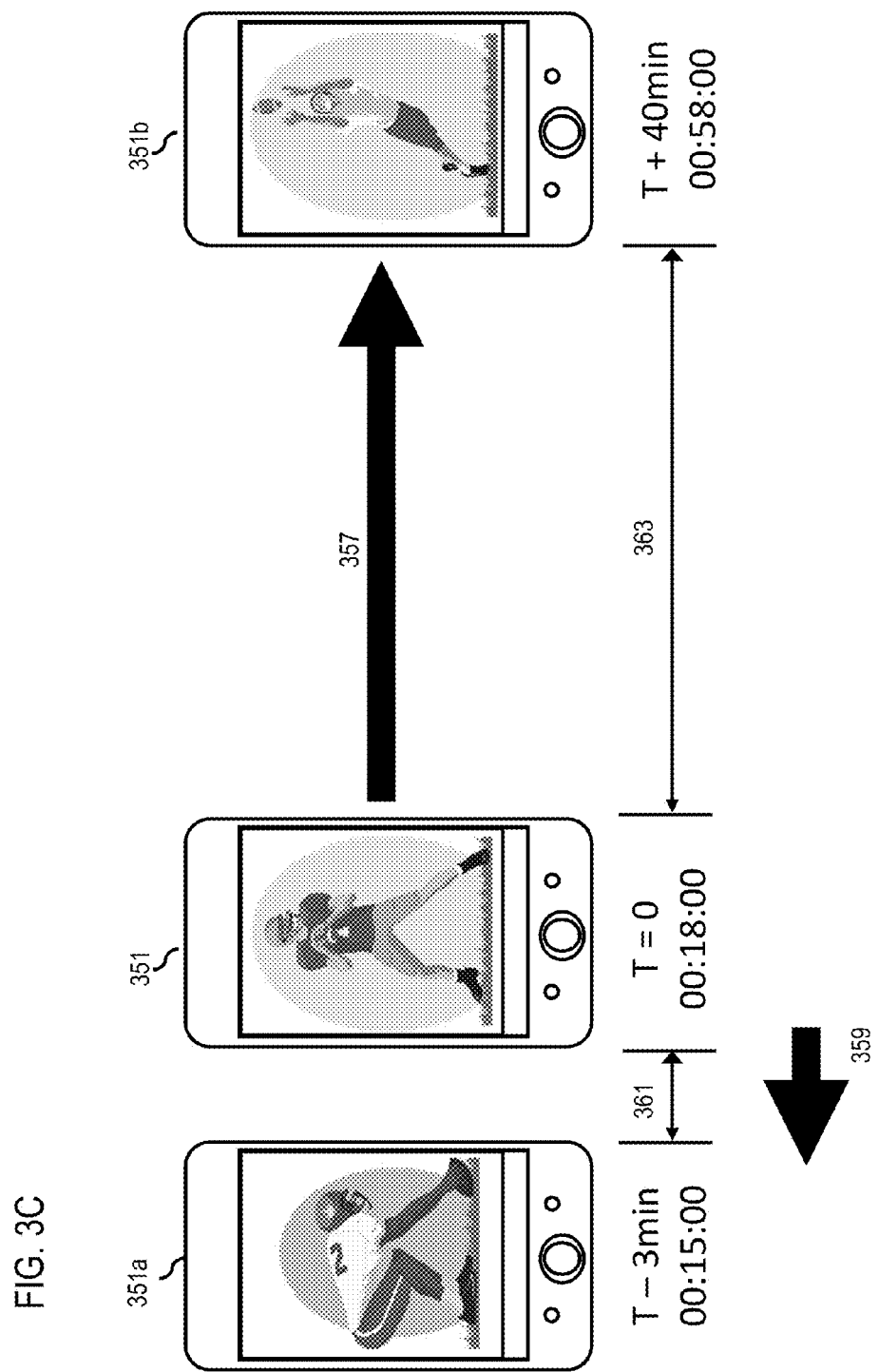

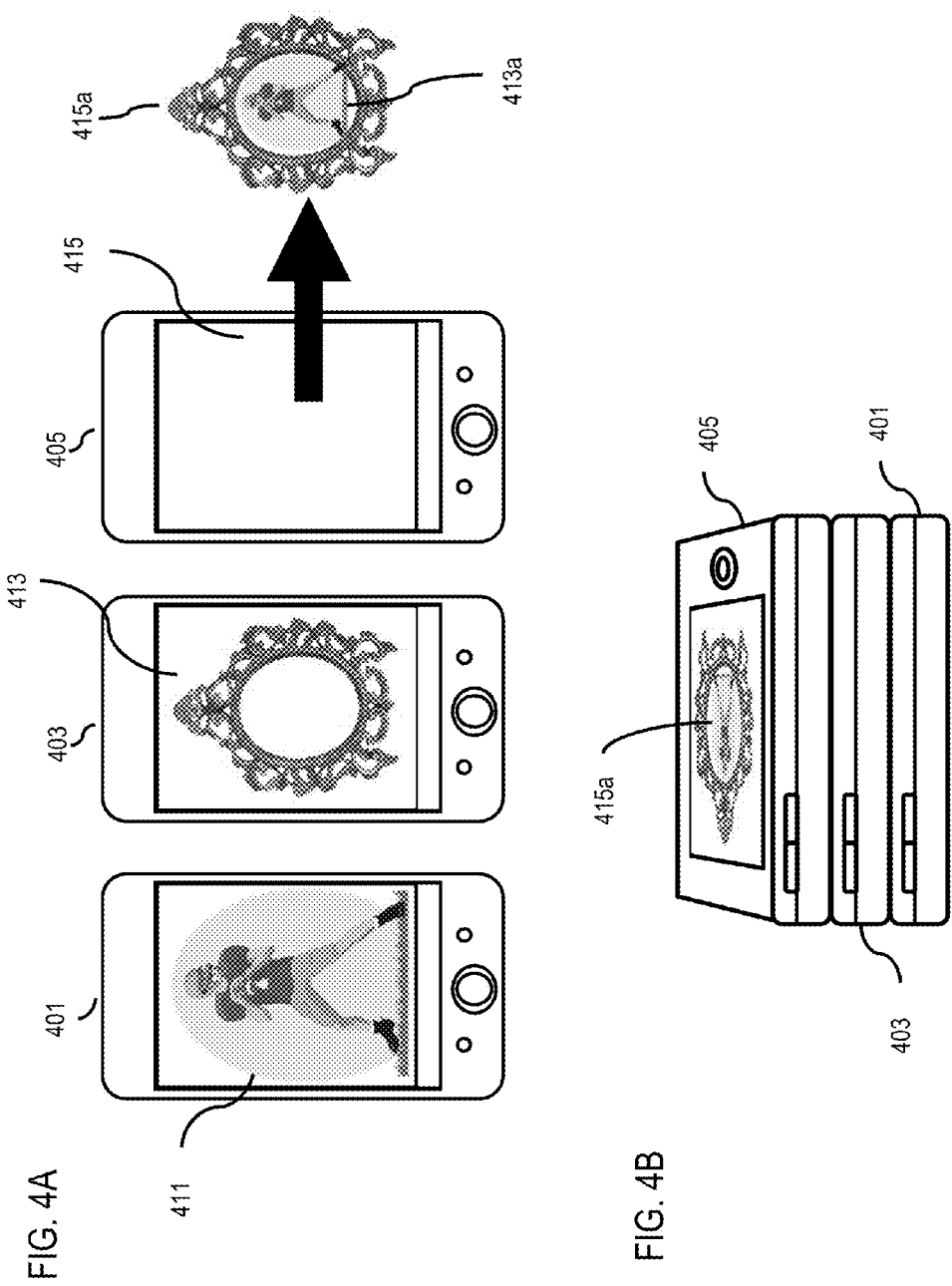

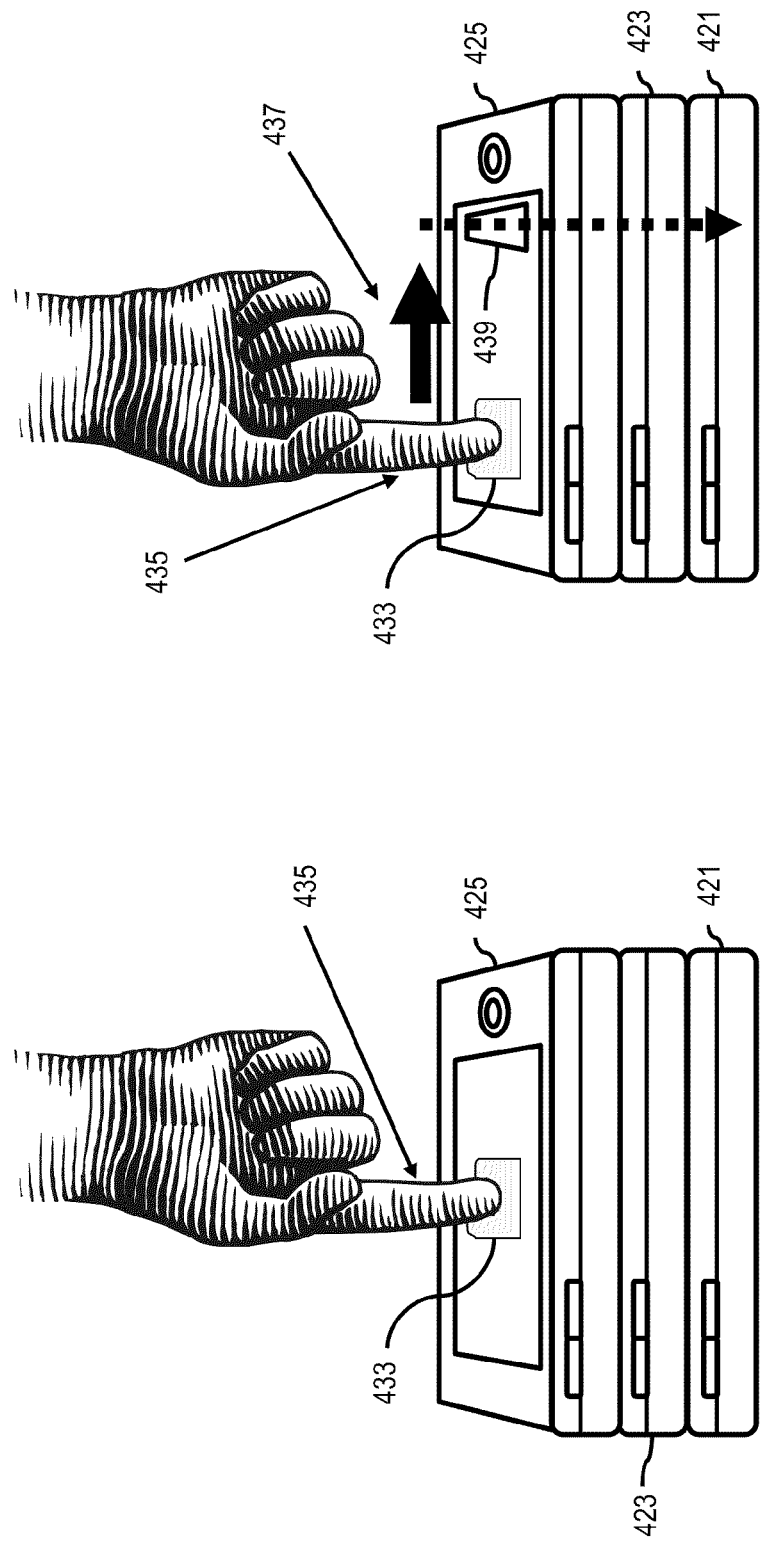

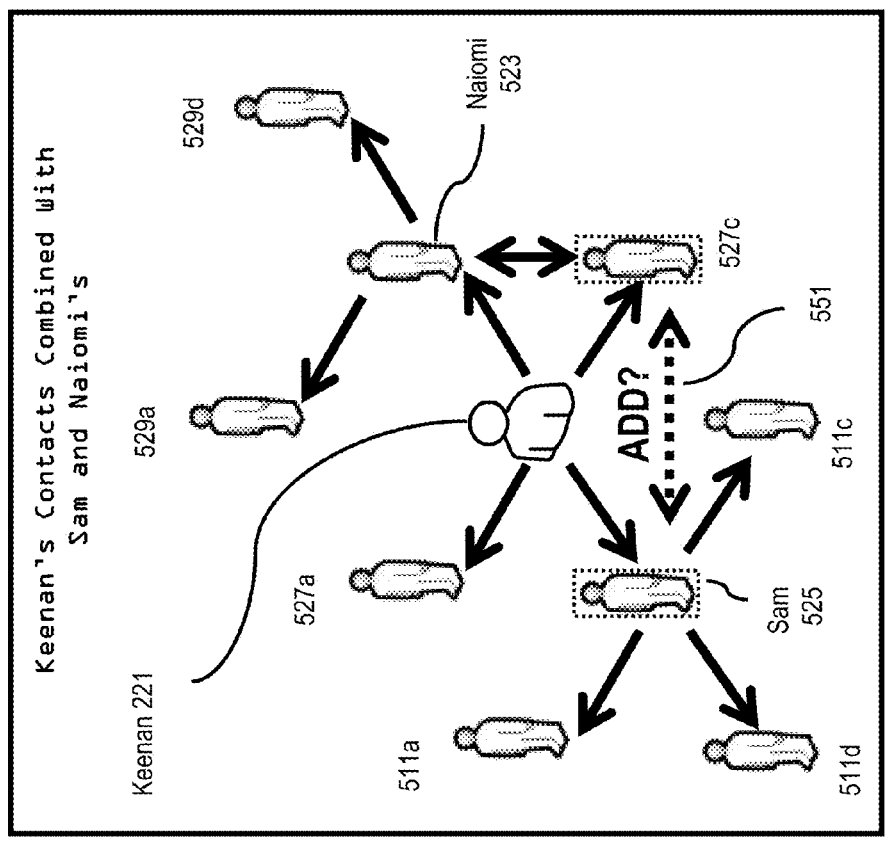

METHOD AND APPARATUS FOR GENERATING A VIRTUAL INTERACTIVE WORKSPACE

RELATED APPLICATION

This application is a continuation-in-part of prior application Ser. No. 12/757,754, filed Apr. 9, 2010, which is herein incorporated by reference in its entirety.

BACKGROUND

Mobile devices are rapidly becoming the computing device of choice for today's tech-savvy, on-the-go users. Very often, mobile device users desire to engage in real-time collaborative processing tasks or social networking sessions with other wireless device users. The rise in popularity of social networking mediums such as Facebook®, MySpace®, LinkedIn®, Twitter®, various blogs sites, chat rooms, peer-to-peer applications and the like, is due in much part to the fact that such interaction can be performed on-the-go.

The overall quality of experience of a mobile device user as they engage with others in a collaborative networking environment depends on various factors. In particular, the experience depends on the extent to which the user's device can visually depict all involved parties. Another factor is the ability of shared services or applications to promote seamless interaction amongst users (e.g., real-time file sharing). As yet another factor, the persistent movement, orientation, placement or whereabouts of users relative to a defined physical or network environment in which they interact impacts the quality of the experience. Unfortunately, while today's social networking and collaborative software applications are designed to readily facilitate user interaction, the small display of today's wireless devices limits the extent of this interactivity. The small form factor of mobile devices, while making them attractive for mobility purposes, allows only a limited amount of information to be presented at a time. This can diminish the collaborative visual and interactive perspective the user desires.

SOME EXAMPLE EMBODIMENTS

Therefore, there is a need for an approach to enable collaborative tasks to be performed more efficiently by mobile device users by enhancing the workspace in which they interact.

According to one embodiment, a method comprises determining to detect location information associated with a plurality of devices. The method also comprises determining to create a virtual workspace among the devices based, at least in part, on the location information. The virtual workspace corresponds to one or more applications, one or more services, or a combination thereof common to the devices. The method also comprises determining to monitor movement of one or more of the devices. The method further comprises determining to manipulate the virtual workspace, the one or more applications, the one or more services, or a combination thereof based, at least in part, on the movement.

According to another embodiment, an apparatus comprises at least one processor. The apparatus also comprises at least one memory including computer program code for one or more computer programs, the at least one memory and the computer program code configured to, with the at least one processor, cause the apparatus to determine to detect location information associated with a plurality of devices. The apparatus is also caused to determine to create a virtual workspace among the devices based, at least in part, on the location information. The virtual workspace corresponds to one or more applications, one or more services, or a combination thereof common to the devices. The apparatus is further caused to determine to monitor movement of one or more of the devices. The apparatus is further caused to manipulate the virtual workspace, the one or more applications, the one or more services, or a combination thereof based, at least in part, on the movement.

According to another embodiment, a computer-readable storage medium carrying one or more sequences of one or more instructions which, when executed by one or more processors, cause an apparatus to determine to detect location information associated with a plurality of devices. The apparatus is also caused to determine to create a virtual workspace among the devices based, at least in part, on the location information. The virtual workspace corresponds to one or more applications, one or more services, or a combination thereof common to the devices. The apparatus is further caused to determine to monitor movement of one or more of the devices. The apparatus is further caused to manipulate the virtual workspace, the one or more applications, the one or more services, or a combination thereof based, at least in part, on the movement.

According to another embodiment, an apparatus comprises means for determining to detect location information associated with a plurality of devices. The apparatus also comprises means for determining to create a virtual workspace among the devices based, at least in part, on the location information. The virtual workspace corresponds to one or more applications, one or more services, or a combination thereof common to the devices. The apparatus further comprises means for determining to monitor movement of one or more of the devices. The method further comprises means for determining to manipulate the virtual workspace, the application, the service, or a combination thereof based, at least in part, on the movement.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2B-2D are diagrams of several user equipment interacting to generate and collaborate within a virtual workspace environment as described with respect to FIG. 2A, according to various embodiments;

FIGS. 3A-3C are diagrams of user equipment collaborating to perform media processing within a virtual networking environment, according to various embodiments;

FIGS. 4A and 4B are diagrams of user equipment collaborating to perform image processing within a virtual networking environment, according to various embodiments;

FIGS. 4E and 4F are diagrams of a user interacting with user equipment to affect how data is shared between respective user equipment, according to various embodiments;

FIGS. 5B-5H are diagrams of several user equipment collaborating to perform data sharing and networking within a virtual workspace environment, according to various embodiments;

DESCRIPTION OF SOME EMBODIMENTS

Examples of a method, apparatus, and computer program for enabling the generation of a virtual workspace for sharing and processing data and communicating amongst a plurality of user equipment—i.e., mobile devices—are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
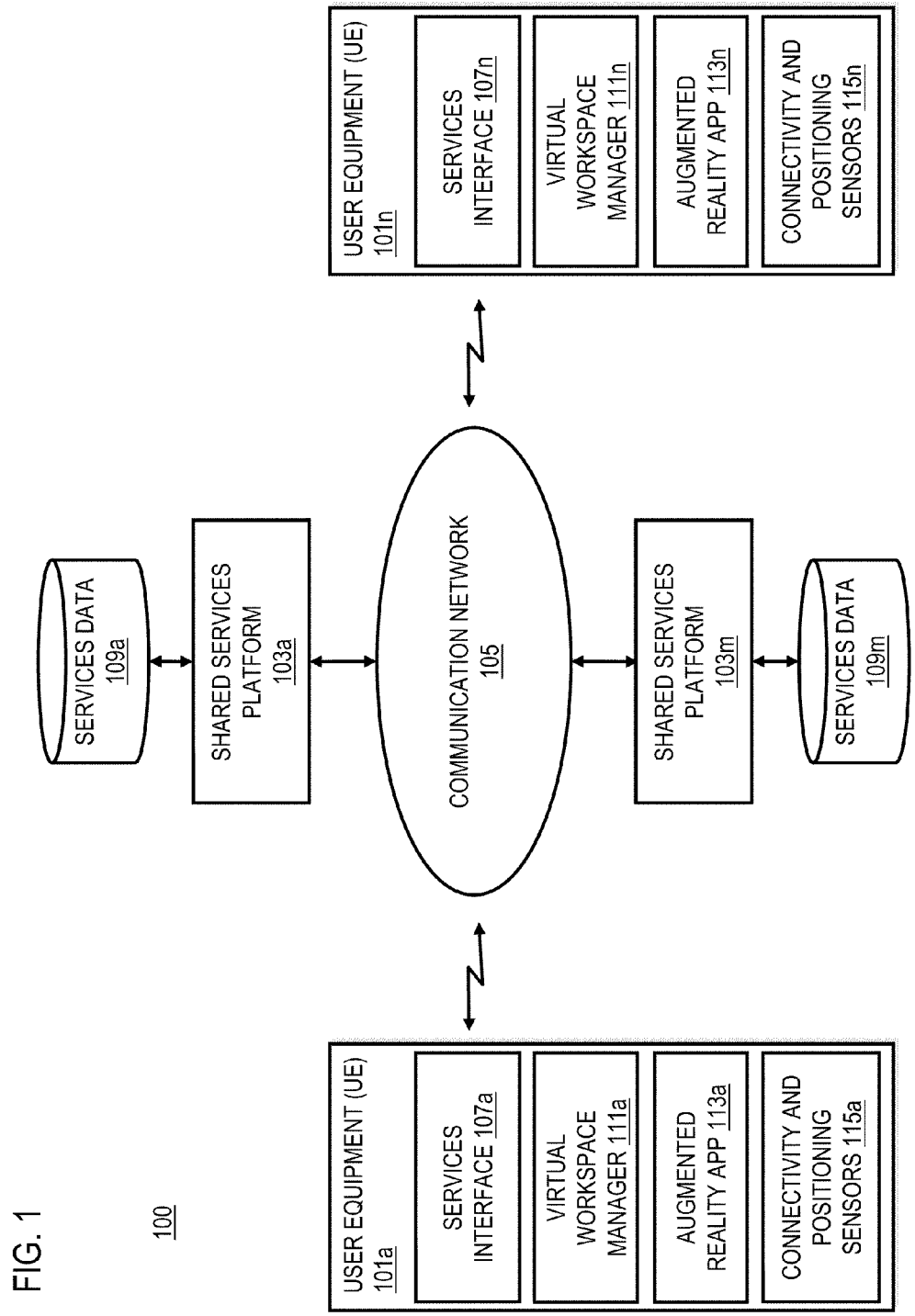
FIG. 1 is a diagram of a system capable of enabling equipment users to interact with one another within the context of a collaborative, virtual networking environment, according to one embodiment.

FIG. 1 is a diagram of a system capable of enabling mobile equipment users to interact with one another within the context of a collaborative, virtual networking environment, according to one embodiment. As mentioned, typical social networking applications and services allow users to readily share media such as images, music and video, communicate over one or more social networking platforms, perform various file or data processing tasks, control other devices through various signal processing and control means, etc. Unfortunately, mobile devices by default feature small visual displays, which can only show a limited amount of information. With such limited visual perspective, the user cannot possibly experience a high level of social or physical interactivity with the various users in which they are engaged. Even when the user's mobile equipment is a conventional computing device such as a netbook, notebook or laptop featuring a larger display than that of a cell phone or Smartphone, confining a shared workspace to the dimensions of an operating system desktop diminishes the quality of the collaborative experience.

Hence, the approach described herein pertain to methods and systems for enhancing the ability of user equipment to perform shared processing and communication tasks using the space outside the device screen as a virtual workspace. In certain embodiments, the term "workspace" refers to the proximal amount of physical or virtually perceivable space made available to a device user for interacting with other users for the purpose of performing various shared processing or communication tasks (work). By way of example, a "virtual workspace" as presented herein pertains to any perceivable space that can be rendered to a user device in a manner suitable for representing a broader physical, social or network environment or shared processing context. Within the workspace, a user can interact with other users through active participation and sharing of common services within the same environment. System 100 of FIG. 1 presents an implementation of such a workspace in accord with an embodiment.

The system 100 comprises different user equipment (UEs) 101a-101n (also collectively referred to as UEs 101) having connectivity to one or more shared services platforms 103a-103m (also collectively referred to as shared services platform 103) via a communication network 105. In certain embodiments, each of the UEs 101 includes respective services interfaces 107a-107n (also collectively referred to as services interfaces 107). As an example, the services interface 107 allows the respective UE 101 to exchange or share data over the network 105 with the shared services platform 103 and/or other UEs 101. The data can be any content, information or applications intended to be stored to and retrieved from the shared services platform 103 as services data 109a-109m (also collectively referred to as services data 109). This can include, but is not limited to, images, video, audio, contact list data, executable instruction sets such as applets, documents, message threads, profile data, visual descriptors, etc. By way of example, the services interface 107 may be a dedicated media management application (e.g., a web service application), an internet browser from whence the user may establish a session with the media services platform 103, or the like.

In general, the services interface 107 and the media services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), personal area network (PAN) (e.g., a Bluetooth® PAN), and the like.

The shared services platform 103 pertains to any hosted (or even client/server based) applications intended to promote the exchange of data, enable concurrent processing capability between users or facilitate interactive or real-time communication between one or more registered users of said service. Examples include, but are not limited to social networking service providers such as Facebook®, MySpace® and LinkedIn®, shared content and application processing providers such as Google Apps® by Google®, Exchange® or Office Live® by Microsoft® and Huddle® applications, various cloud computing or shareware/groupware providers, or the like. In general, the shared services platforms provide differing capabilities to users who collaborate with one another using it, including but not limited to contact and profile management—i.e., for the user and his/her social or business network contacts), discussion/chat rooms, whiteboards, file sharing, document creation and management, project management, permissions and restrictions management, meeting and conference management, content/user/data search capability, shared dashboard capability, etc. As capabilities and providers differ vastly, many of the aforementioned capabilities are generally integrated in the shared services platform 103. Hence, any platform for facilitating collaboration between users is within the scope of the inventive concepts presented herein. Data produced or exchanged by participants is maintained by the respective shared services platform 103 as services data 109.

As mentioned above, there are many different shared services platform providers and applications. It should be noted that the different UEs 101 may access different shared services platforms 103 depending on the preferences of a respective user. Hence, in the figure as shown, distinct users of UE 101 can access the same shared services platform 103a or a different platform 103m for the purposes of facilitating communication amongst themselves or other users. It will be seen in later discussions that regardless of the platform of choice, the approach described herein enables convenient sharing of services data 111 amongst users independent of the chosen platform 103.

In addition to the services interface 107, each UE 101 features respective virtual workspace managers 111a-111n (also collectively known as virtual workspace managers 111) and augmented reality applications 113a-113n (also collectively known as augmented reality applications 113). In certain embodiments, the virtual workspace manager 115 includes one or more components (not shown) for generating a virtual workspace among a plurality of UEs 101 based, at least in part, on the location information of the UEs 101, and then manipulating the virtual workspace based on the movement or locations of the corresponding of the UEs 101. By way of example, the virtual workspace may be used to depict a user interface of one or more applications, services, or the like that are common to the UEs 101. It is contemplated that the functions of the virtual workspace manager 115 may be combined in one or more components or performed by other components of equivalent functionality (e.g., the shared platform 103).

In certain embodiments, once the virtual workspace is created by the virtual workspace manager 115, the UE 101 enables the augmented reality applications 113 to generate real-time representations of the virtual workspace environments with virtual computer-generated imagery. More specifically, the view of workspace is modified or generated by the application 113 and/or the virtual workspace manager 111 such that the view of the virtual workspace presented in any one of the participating UEs 101 is based, at least in part, on an orientation (e.g., location, directional heading, tilt angle, etc.) of the UE 101 in relation to the virtual workspace. For example, when the UE 101 is operating in an orientation that is within the same plane as the virtual workspace, the augmented reality application 113 and/or the virtual workspace manager 111 may depict, for instance, a virtual window showing a portion of the virtual workspace that is visible from the perspective of the UE 101. When the UE 101 is moved or picked up so that the UE 101 is either above or below the plane of the virtual workspace, the application 113 and/or the virtual workspace manager 111 may render computer imagery that can pan or zoom over the virtual workspace based on the location of the UE 101 with respect to the virtual workspace. More specifically, by raising the UE 101 above the plane of the virtual workspace, the application 113 can render a wider angle view of the virtual workspace so that more of the virtual workspace is visible in the rendered view of the UE 101. In certain embodiments, the user interfaces of the respective UEs 101 are partial views to the virtual workspace. Moreover, each of the devices may have different views of the workspace at different zoom levels.

In certain embodiments, physical movements of the UEs 101 correspond to equivalent movements in the virtual workspace. These movements (e.g., panning along the virtual workspace) can be used, for instance, to locate virtual objects within the virtual workspace, select the objects, change the properties of the objects, and the like. The location, selection, and changing of the properties can be further specified by different movements (e.g., rotation of the UE 101, alignment of the UE 101, etc.).

Consider, for example, a scenario where a user is operating a cell phone with integrated video capture that is recording the user's current surroundings. The augmented reality (AR) client application 113 operable on the cell phone can interact with the video capturing device, location detection systems and any other sensory mechanisms of the cell phone, to overlay various graphic elements atop the recorded image or a virtual representation of the recorded image to show the visible portions of the virtual workspace and the objects contained therein. The graphic elements can convey useful contextual information to the user regarding the images being captured, such as the names of objects, addresses, news data, advertisements, other attractions within proximity to the image being captured, etc., all in real-time. Moreover, the rendered images are contextually relevant to the services and/or applications associated with the virtual workspace. In the current example, the augmented reality application is a client application 113 for generating AR related views respective to detected/shared location, orientation, position, movement or whereabouts information or content (e.g., as determined by a connectivity and position sensor, to be described later). In some instances, the shared services platform 103 can feature various AR related applications as well for interacting with the AR client application 113.

In general, the UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). Moreover, the UE 101 may execute one or more software applications or utilities, including but not limited to those for enabling or facilitating network access and communication, internet browsing, social networking, e-mail communication, file sharing and data transfer, word processing, data entry, spreadsheet processing, mathematical computation, etc. These applications and utilities may also be interoperable, so as to enable the execution of various features of the aforementioned application and utilities to be simultaneously executed to enable specific user tasks. Data generated by or exchanged with the device, such as by other devices or by way of the shared services platform 103, can be stored to a datastore or memory (not shown) of the UE 101.

Each UE may also have operable thereon one or more connectivity and positioning sensors (CPS) 115a-115n (also collectively referred to as CPS 115) for enabling respective devices to detect the location of other devices relative to its current position, orientation or movement. Furthermore, the CPS 115 enables communication sessions to be established between detected devices to facilitate a means of exclusive communication between the devices for creating the virtual workspace and/or manipulating the services and/or applications depicted in the virtual workspace. More regarding this capability is presented in the following section.

Figure 2A:
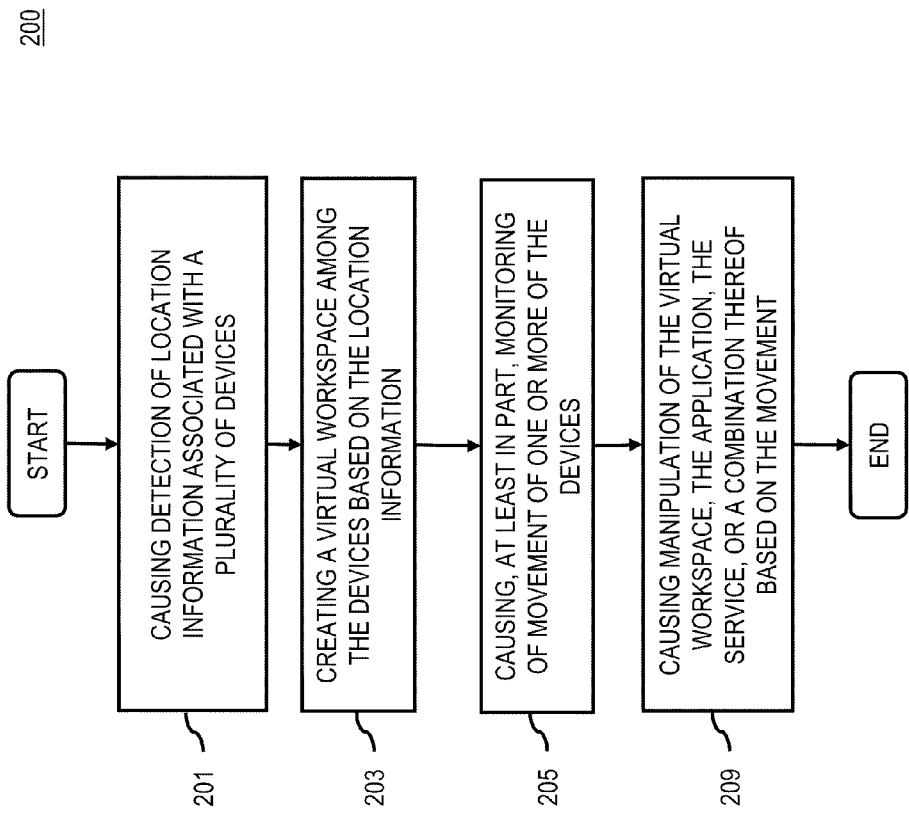
FIG. 2A is a flowchart depicting the process for enabling equipment users to interact with one another within the context of a collaborative, virtual networking environment, according to one embodiment.
Figure 2B:
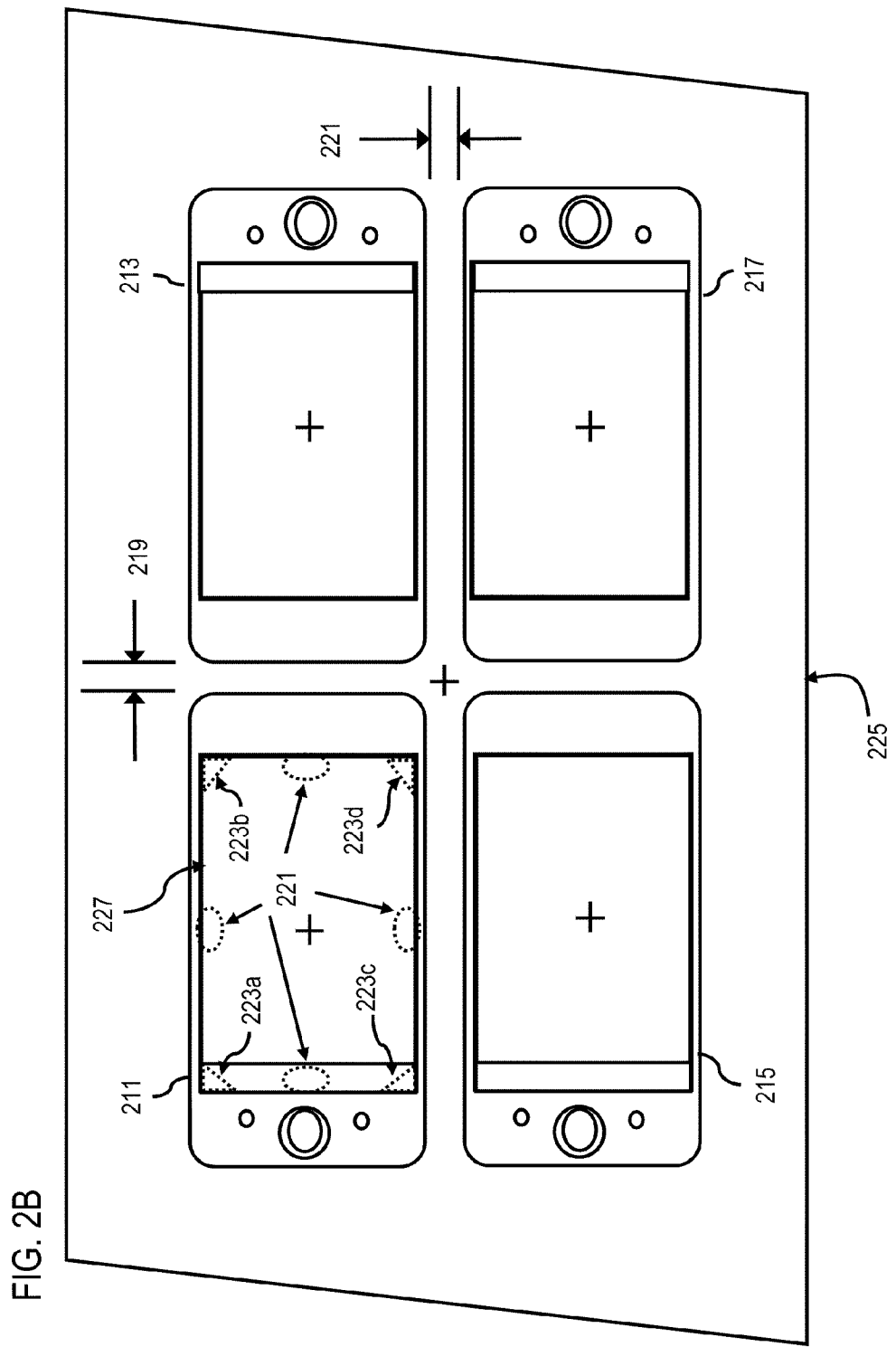

FIG. 2A is a flowchart depicting the process for enabling equipment users to interact with one another within the context of a collaborative, virtual networking environment, according to one embodiment. The process 200 of FIG. 2A is explained with respect to FIGS. 2B-2D, which depicts UE interacting to generate and collaborate within a virtual workspace environment. In certain embodiments, the CPS 115 is a positioning system that combines ultrasonic and inertial positioning sensors to detect changes in movement, position, orientation or presence of other devices or UEs 101. In the context of the present invention, this capability facilitates collaborative communication amongst complimentarily placed devices and enables respective devices to perform shared application usage. By way of example, as shown in FIG. 2B, a UE 101's relative position with respect to other nearby UEs 101 is measured using ultrasonic signals while inertial positioning sensors are used to detect shifts in movement from the position. The CPS 115 functionality, while present on each user device 211-217 of FIGS. 2B-2D, will be described from the perspective of a single UE 101, namely user device 211. It will be understood, however, that all of the devices 211-217 shown have the same or substantially the same relative design. Further, while devices 211-217 are depicted as being identical, the CPS 115 functionality as presented herein is applicable to any device type or form factor. Thus, the ability to detect skew or alteration in position, orientation, movement or the like is achievable even with differing sensor types or orientations within a given differing device type.

FIG. 2B depicts a plurality of user devices 211-217 positioned relative to one another to enable shared communication and interaction via virtual workspace. In this example, each device is proximally positioned such that their relative adjacent (side-by-side) distance 221, parallel distance (face-to-face) 219, and/or diagonal distance (not shown) from one another is can be determined using the functions of the CPS 115. By way of example, these distances can be calculated, at least in part, based on the extent of distance between complimentary of the one or more sensors 221 and 223a-d affixed at various points of two or more user devices 227.

In one example, the devices have four transmitters 221, located at the middle of the device and four receivers 223a-d, located at the corners to constitute at least some of the components of the CPS 115. In certain embodiments, both transmitters and receivers use a small slot opening near the bottom of the device to minimize the risk that the user's hand is blocking the sensors and to create a uniform sensitivity to all directional changes (e.g., filtering out unwanted frequencies from being detected). Moreover, it is contemplated that in certain embodiments, each transmitter 221 as placed has 180 degree radiation patterns while receivers feature 270 degree patterns. This is advantageous in rotational, spatial or kinetic activity algorithm design given that the angle of the transmitter and the receiver can be approximated.

In this example, ultrasonic positioning detection starts with an infrared signal, which is sent by the transmitters 221 uniformly to all directions. This signal serves as a starting point for calculating the ultrasound transmission delay. The IR-signal also has an ID-code which identifies the transmitter and informs the other devices whether the transmitter device is stationary or moving. The IR-signal is also used to define transmission slot for every device to avoid collisions.

The time difference between the beginning of the IR-signal and the instant of reception of the ultrasound burst is used to calculate the distance. The receivers 223a-d analyze the envelope of the burst signal, where the envelope is created using analog electronics rather than fast AD-conversion and processing. From this, the Q-value—the amount of energy released in response to movement of the device—of the transmitters 221 and the receiving circuitry 223a-d is known. Consequently, the burst envelope waveform can be approximated.

The detected waveform is then used in calculating the starting point of the received burst since the beginning of the burst is always below the corresponding noise limit. The transmitted ultrasonic signal is made sufficiently high and bandwidth is minimized in order to minimize external noises from the measurement. Also, signal levels of transmitters 221 are increased using a resonance circuit with controlled Q-value.

In general, transmitted ultrasonic signals are received with two or more microphones (the receivers 223a-d). Since the dimensions of the user device is known, the distance and the angle of the various transmitters 221 can be calculated using trilateration and clustering techniques. Clustering and trilateration accuracy is improved by combining the positioning data from different devices—in other words, oversampling and then utilizing the average.

Inertial positioning sensors of the CPS functionality 107 are employed is using 3D gyroscopes, 3D accelerometers and 3D compass technology. Momentary positions and gestures are persistently calculated as well using the data collected by these devices. Consistent observance of relative positional change is performed for each device individually, as well as relative to each other.

Overall, the CPS functionality 115, implemented in the form of the various sensor arrays described above, can be positioned just below a given phone's display screen and connected to an internal debug serial port. While presented from the perspective of devices aligned along a common plane 225, the same principles apply when the devices are stacked upon one another. Based on the determined position, movement or orientation of the different devices 211-217 relative to one another, a communication session can be initiated by way of Bluetooth or as a wireless local area network WLAN connection (which may accommodate larger connectivity distance thresholds than Bluetooth). Establishment of this communication session relative to the current locations of devices sets the initial parameters (e.g., boundaries) of the virtual workspace in which the devices will ultimately interact by way of device user. Resultantly, the devices 211-217 can be subsequently moved without eliminating the connection or dissipating the established workspace.

In conjunction with the connectivity and position sensors, each user device (e.g., UE 101 of FIG. 1) can also share spatiotemporal data with a respective shared services platform 103. In certain embodiments, the term "spatiotemporal data" refers to any data that conveys a particular moment in space and time for a particular object in question. Spatiotemporal data is often used in applications where understanding of an object's relative change in location, position or perspective from moment-to-moment is critical. This may include applications such as Geographic Information Systems (GIS), environmental data management systems and multimedia databases.

The overall procedure for enabling interaction of devices within the context of a virtual workspace displayable for corresponding to a representation of physical phenomena is presented with respect to the process 200 of FIG. 2A. Some of the capabilities and applications resulting from the establishment of this virtual workspace are then further explored in FIGS. 2B-2D, as well as the subsequent figures. It will be recognized that establishment of a connection between complimentary devices may include means for accounting for permissions, settings and various other connection requirements.

Figure 8:
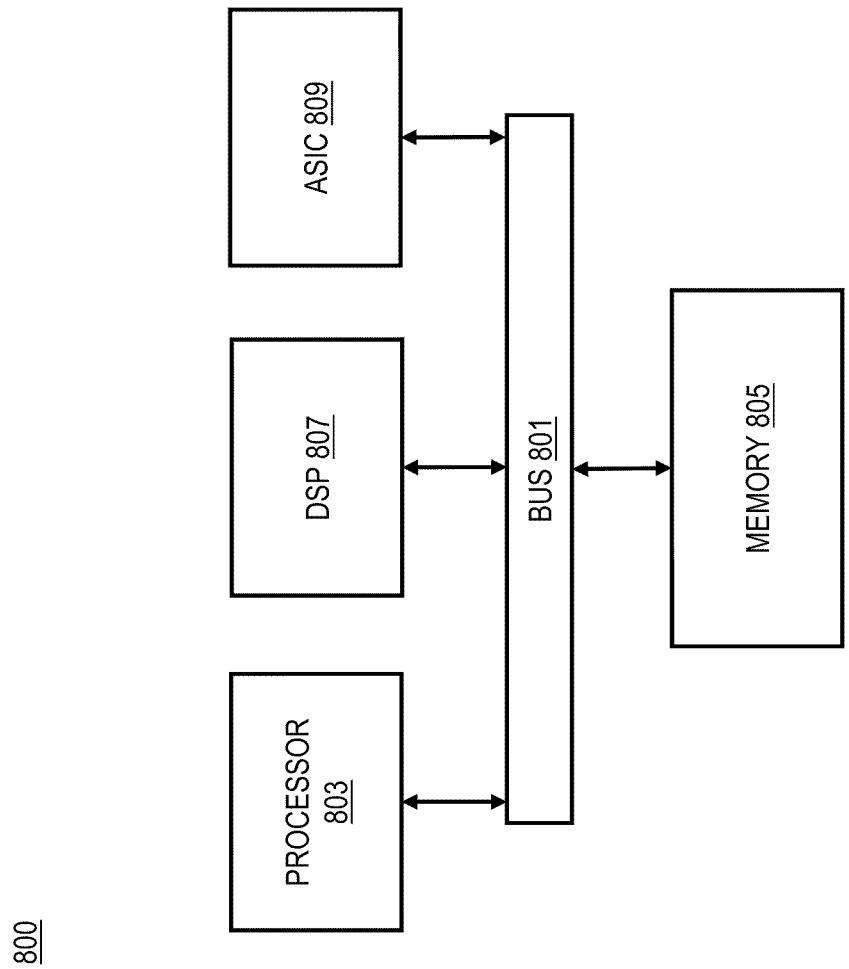
FIG. 8 is a diagram of a chip set that can be used to implement an embodiment of the invention.

FIG. 2A is a flowchart depicting the process for enabling equipment/device users to interact with one another within the context of a collaborative, virtual networking environment, according to one embodiment. By way of example, the virtual workspace manager 115 performs the process 200 and is implemented in a chip set including a processor and a memory as shown in FIG. 8. In addition or alternatively, all or a portion of the process 200 may be performed by the shared services platform 103. In step 201, the devices 211-217 are placed in a manner as presented in FIG. 2B, or within close proximity to one another in some form or fashion, thus causing each device 211-217 to detect location information associated with the plurality of devices 211-217. Alternatively, the connection is performed via a proxy service or interface operable over the communication network 105 (e.g., the internet) for facilitating the connection between distant or remotely located devices. Having detected the plurality of devices 211-217, a communication session is established between some or all of the devices 211-217, thus initially defining or establishing the virtual workspace that will be rendered ultimately to the individual user device 211-217. This corresponds to step 203, wherein the initial virtual workspace is bound by the original spatial/physical distances between devices upon establishment of the connection (Example: adjacent distance (side-by-side) 221, parallel distance (face-to-face) 219 of FIG. 2B).

In step 205, any further movement of the one or more devices 211-217 subsequently is monitored by the interacting devices 211-217. The movement of devices 211-217 subsequent to the establishment of the initial virtual workspace is depicted in FIG. 2C. Specifically, the user of device 211 physically moves a distance from an approximate starting point O in a direction A to a location proximate to point 1. Device 213 moves a distance from the starting point in a direction B to a location proximate to point 2. Device 217 moves a distance from the starting point in a direction C to a location proximate to point 3. Finally, device 215 moves a distance in a direction D to a location proximate to point 4. Establishment of the final parameters of the workspace is performed automatically by the virtual workspace manager 115 in conjunction with a specified threshold (e.g., a default or maximum extent of the virtual workspace), or manually by a given device user, corresponding to step 209. Having established the new locations and thus redefined the physical area comprising the workspace, the boundaries defining the virtual work space are also manipulated/adjusted accordingly. For this example, the result is a larger virtual workspace for complimentary devices 211-217 to be shown to interact within. The spatial distances 231, 233, 237 and 235 corresponding to the distance between points 1 and 2, 1 and 4, 2 and 3 and 3 and 4 respectively, characterize the parameters, boundaries or extent of the virtual workspace to be rendered to the display, such as in accordance with a proportional relationship (Example: X sq ft=Y pixels per sq inch resolution).

Given the proportional relationship between the physical distance/location information and the virtual representation thereof, the closer the devices remain to the point of initial connection, the lesser the extent of the virtual workspace available for display. Conversely, the further the devices are moved from the point of initial connection, but within the range of connectivity, the greater the extent of the virtual workspace available for display. The maximum size of the virtual workspace as presented to the user can be fixed (e.g. a predetermined area), defined on the basis of the furthest spatial/physical distance between devices, or can change dynamically based on continuous movements and hence changes in proximity. Hence, the ability to represent the virtual workspace to a device and the location of the virtual objects within it is based on current movement, position, proximity and orientation of devices relative to one another. Further, the scale of the displayed information (e.g. virtual objects) to a display can depend on the proximity of the devices.

In accordance with the exemplary embodiment of FIG. 2D, the virtual workspace 241 as created to correspond to and represent the real-world physical interaction of complimentary devices 211-217 in FIG. 2C is rendered to the display interface 245 of each device 211-217. In the exemplary embodiment, the virtual workspace 241 as generated on user device 211 is shown. In certain embodiments, the virtual workspace can be generated by the augmented reality application 113 operating upon each device 211-217, perhaps based in part as well on services data 109 provided by the shared services platform 103, where the continuous movement of current devices 211-217 is shown as an overlay atop an area designating the virtual workspace. It is also contemplated, therefore, that a map, terrain depictions and other visual indicators could be shown to further represent current real-world conditions. Virtual representations of devices 211-217 are therefore shown positioned, located or oriented within the workspace 241 in a manner consistent with current real-time conditions. Still further, an optional virtual storage device 255—a dedicated data store defined for use by the complimentary devices 211-217 is shown.

A benefit afforded by depicting physical events between respective devices in a virtual display 241 is expansion of a user's overall workspace and work capacity. For example, there are various factors that contribute to an enhanced collaborative environment for the user as a result of enhanced operating freedom. These include expanded numbers of devices to engage in shared interaction with, the ability for the defined boundaries of the workspace to be expanded through repositioning of collaborating devices, increase in the number of shared applications available for respective devices to interact with, increase in the number of data sources available for sharing amongst respective devices, etc. All of these factors, whether taken singularly or in combination, result in an experience beyond what the user can expect with a conventional display capability.

As further movement of user devices occurs within the virtual workspace 241, the user display 245 is updated to represent the change in location, position or orientation. The display can be updated in accordance with a periodic refresh rate or triggered by any perceived movement. One or more action buttons 283-287 may also be rendered to the display for enabling the execution of various actions and applications to be performed amongst the devices 211-217 within the context of the established workspace 241 connections. In addition or alternatively, the various actions and applications may be executed by a physical movement one or more of the devices 211-217 (e.g., rotation, stacking, etc.). By way of example, the actions and applications may include file transfer 257, such as presented visually to the display 245 as occurring between devices 211 and 215, music file 251 sharing as occurring between devices 215 and 217, providing for social control (e.g., common and/or coordinated control) of a function or action among one or more of the devices 211-217, or a range of other applications.

Figure 2E:
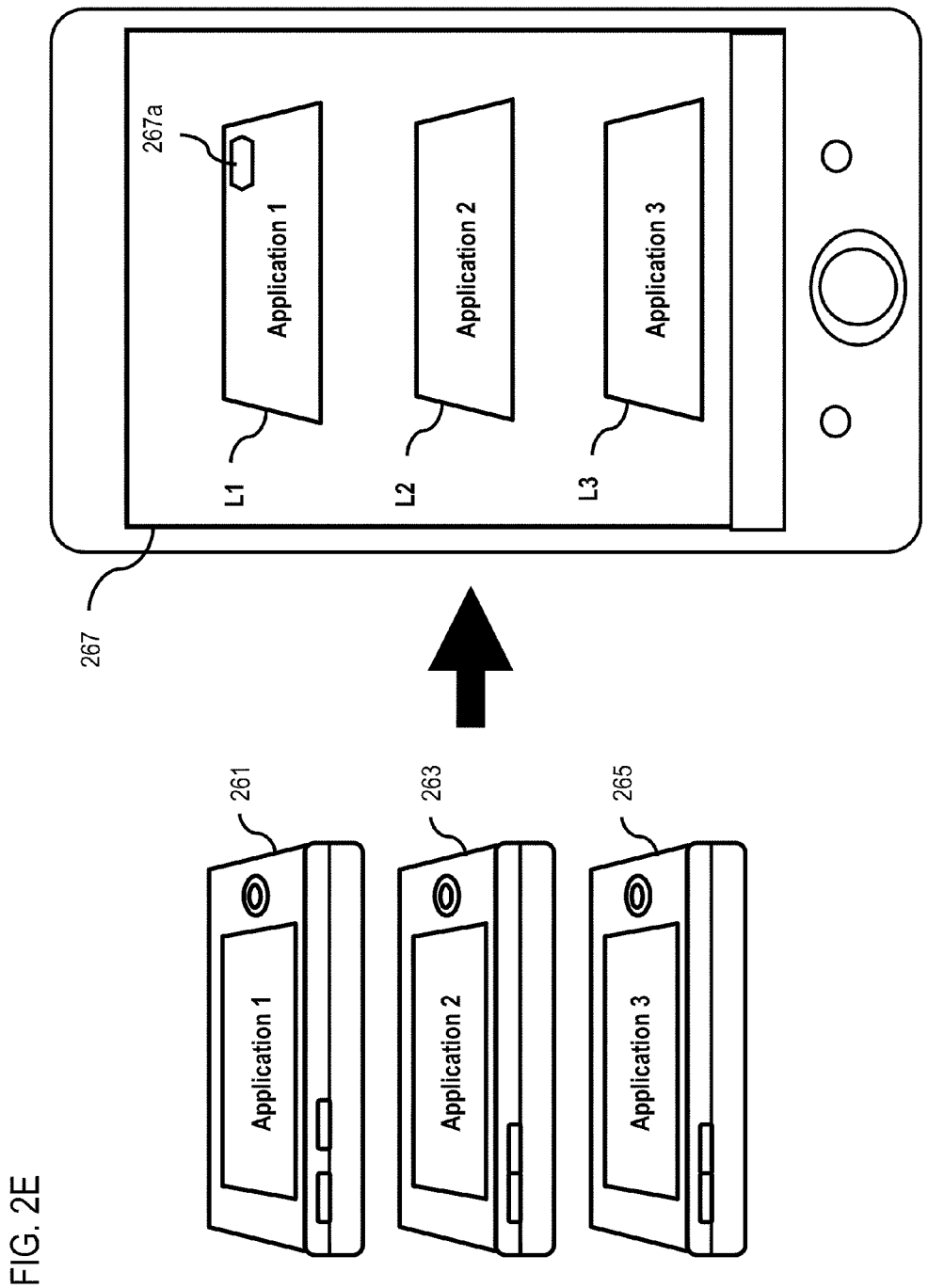
FIGS. 2E-2G are diagrams of user equipment interacting to generate virtual layers relative to one another within a virtual workspace environment, according to various embodiments.
Figure 2F:
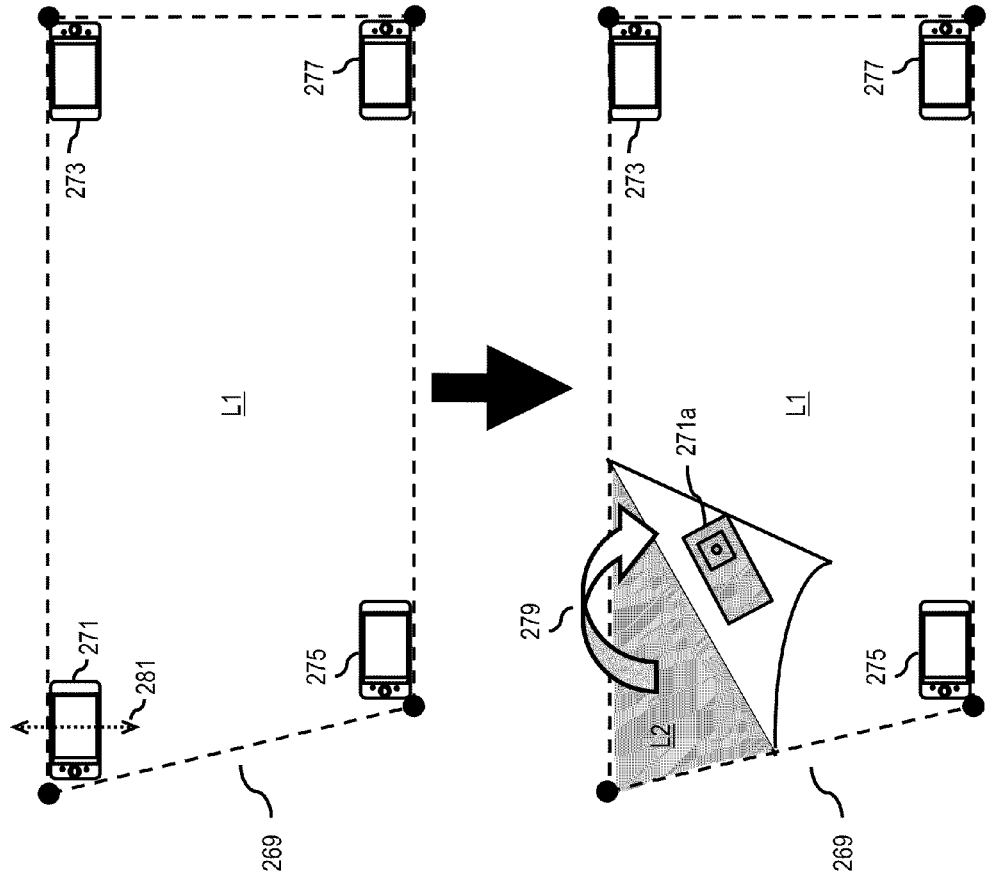
Figure 2G:
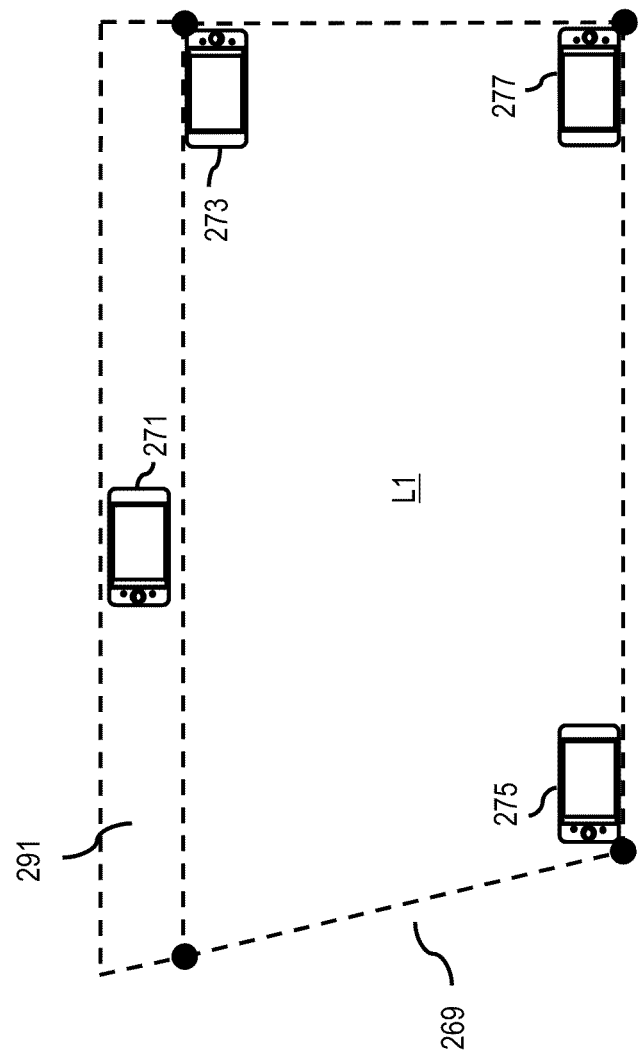

FIGS. 2E-2G are diagrams of user equipment interacting to generate virtual layers relative to one another within a virtual workspace environment, according to various embodiments. By way of example, in FIG. 2E devices 261-265 are connected and aware of each others' position within a virtual workspace. Configured as such, multiple layers L1-L3 may be presented to the user interface 267 of the devices 261-265 for representing specific applications (e.g., Applications 1-3) and/or data 267a. The layers L1-L3 may be associated with different levels of access, control, or a combination thereof with respect to the devices 261-265. For example, the layers L1-L3 may be publicly viewable by all users of respective devices 261-265 within the workspace or privately viewable to a single one or a subset of the devices 261-265. Each layer can present a view to a unique application or a unique view to a single application.

Under this scenario, a layer in the virtual workspace can have both a public area and a private area for each user or device. In relation to the size/boundaries of the virtual workspace, multiple private areas may overlap, but are visible only on each user's device. The private area may also be a layer, such as layer L1, which can be moved on top of the public area. For this configuration, transferring content 267a from a private area L1 to a public area (e.g., layers L2-L3) may be carried out by a user executing a "punch-through" motion on a given device touch screen. "Punch-through" execution is described in greater detail with respect to FIG. 4E. By way of example, the data 267a to be transferred is moved when the user presses or taps on the icon/object 267a representative of the data via the touch screen 267, resulting in the item 267a transferring to a public layer L2 and/or L3. Alternatively, the data 267a can be moved from the private area L1 to the public area L2 and L3 by performing a "flipping" action of the icon/object representative of the data 267a—i.e., the icon/object 267a is flipped like a playing card being turned over on a table.

In certain embodiments, switching between the layers L1-L3 via the user interface 267 is done by associating each device with its own application with associated data (and thus layer) as well as stacking the devices 261-265 in a certain order on top of each other. Resultantly, users may define the order of the layers based upon the orientation and/or positioning of respective interacting devices 261-265 within the virtual workspace. It is noted, for example, that positioning device 265 atop the stack will result in layer L1 being associated with Application 3 and data 267a being associated with layer L3.

In certain embodiments, the user may expose the various layers within the virtual workspace by altering the orientation of respective devices. FIG. 2F depicts devices 271-277, which are positioned to define a virtual workspace 269 and are associated with layers L1-L4. By way of example, a first layer L1 is shown within the virtual workspace 269, the layer corresponding to device 273, which was originally placed topmost within a stack for defining a connection between respective devices 271-277. To expose the second layer L2, the user may perform an action on the device associated with the second layer (e.g., device 271) such as rolling the device 271 about its axis toward the center of the virtual workspace 269. The rolling motion is depicted by curved arrow 279, with the position of the device 271 resulting in exposure of its backside 271a. Alternatively, the user may perform a flicking motion representing turning of the device 271 to expose its backside 271a. In either case, altering the orientation of the device 271 is sufficient to reveal an overlap between layers L1 and L2 (and render exposure of the second layer L2). Alternatively, with device 271 in a corner of the virtual workspace 269, a user can perform a "roll-in" action, spinning the device about its axis 281 so that the topmost layer L1 is rolled-in to expose the second layer L2. It is noted that the "flip-over" or "roll-in" motion performed by the user on device 271, where the first layer L1 is peeled away to expose the second layer L2, is similar to turning the page of a book to expose a subsequent page.

It is noted that layers L1-L4 may be displayed within the virtual workspace 269 concurrently in certain instances. By way of example, a first layer L1 can be positioned adjacent to a second, third and fourth layer L2, L3 and L4 respectively. Under this scenario, layers can be evenly segregated (e.g., occupy one-fourth of the workspace area for representing the four different layers) by virtue of orienting the devices in respective corners of the workspace. When an additional device is introduced to the workspace, hence introducing a fifth layer L5, the virtual workspace is divided evenly among the five devices.

In certain embodiments, a user may define the order or configuration of layers through use of a control zone 291 of the virtual workspace. FIG. 2G depicts a virtual workspace 269 configured with a control zone 291. The control zone 291 may be a corner of the virtual workspace 269 or alternatively an area just outside an edge 285 representing a boundary of the virtual workspace 269. The user may move a device (e.g., device 271) to the control zone 291 to access and define the properties of the virtual workspace 269, change the association of respective layers L1-L4, etc. In certain embodiments, the user may press a button featured to the interface of the device for indicating that the user wishes to move the device to the control zone 291 rather than to extend the boundaries/size of the virtual workspace 269. It is noted that the control zone 291 may be yet another layer for enabling collaborative device interaction within the virtual workspace 269.

FIGS. 3A-5G (as described below) present various applications that can be performed by complimentary devices 211-217 within the context of their interaction with a virtual workspace 241. In particular, the range of example capabilities presented herein fall into the general categories of media processing, image processing and data sharing and networking. It will be readily understood through consideration of these categories, however, that numerous other applications not expressly mentioned herein are within the scope of the examples disclosed. The following paragraphs are presented by way of example only.

In certain embodiments, when a collaborative, virtual network is established between complimentary devices, one application or service they can perform includes media processing. "Media processing" pertains to the means in which devices exchange, execute, edit or otherwise manipulate media items such as music, video, audio and other content within the context of an established virtual workspace. FIG. 3A depicts a media processing interaction between a first and second user device, according to one embodiment. In accordance with the example, the first device 301, has access to one or more video files 305 and 307, and the user desires to perform media processing with a second device user operating within the virtual workspace, device 309. The second device 309 has access to one or more audio files 313-317.

To begin the interaction, one of the device users, say the first 301, selects a particular video file 307 for appearance within the virtual workspace. The user can control the length, duration or extent of preview, playback or execution of the media 307 by simply dragging the device on a flat surface, in this example corresponding to a length and distance of movement represented by arrow 319. Hence, the length, duration or extent of the video corresponds directly to the amount of movement performed and hence detected by a given device. Furthermore, the direction of movement determines whether the media item is displayed, executed or previewed within the virtual workspace going forward or backward in time, corresponding to rightward or leftward motion. For the example in question, the movement 319 of the device is rightward, resulting in a preview represented as forward in time.

For the second device 309, audio file 317 is selected for appearance within the virtual workspace. The user can control the length, duration or extent of preview, playback or execution of the audio 307 by dragging the device on a flat surface, in this example corresponding to a length and distance of movement represented by arrow 321. Again, the duration, extent or length corresponds directly to the extent of movement of the device, where audio file 317*a* is shown to the virtual workspace in greater duration than that of the video file 307.

Now that the audio 317*a* and video 307*a* are displayed within the virtual workspace, and therefore viewable to all complimentary devices operating with that workspace, they can be oriented to appear on top of one another. So, for example, the user of device 301 merge the video file 307 with the audio file 317*a*, such as through drag and drop via the device touch screen displays 303 and/or 311. As a result, the selected duration of video data 307*a* will feature a duration of audio content 317*a* upon playback, the duration of which corresponds to that represented as audio/video segmentation 323. The users can continue to manipulate the data further, such as by shifting the video 307*a* leftward or rightward to modify the point of overlay. The tracks 307*a* and 317*a* remain displayed within the physical workspace even after the devices are lifted from the surface.

In addition to video and audio, other track types may include but is not limited to, text (titles), still images, transition effects between two video clips, the track type may also be a segment broadcasted on TV or live video from the Internet. As such, the user can define the duration and media source, but cannot define the actual shown content as that is determined by the broadcaster. As yet another consideration, the surface or the direction of movement 319/321 of a given media item can be performed circularly, resulting in the video or audio tray being played in a loop feedback mode (e.g., video roulette). In this case, the circle is divided into sectors where the clips and other elements are arranged.

As another means of media processing of the audio 317*a* and video 307*a* files, the combined, single new media clip can be created by stacking devices 301 and 309 on top of each other. In this example, the lower device 309 contains the audio clip 317*a*, while the upper device 301 contains the video clip 307*a*. The combined media is laid out in the virtual workspace by dragging the two stacked devices through the flat surface, each movement being shown to corresponding display of each device within the virtual workspace representation in real-time. The order of the stacked devices (from bottom to top) defines the order in which the media clips shown on those devices is overlaid (e.g. the clip in the bottom devices is placed in the lowest layer in the combined clip).

As the virtual workspace is large, different users having complimentary devices operating with the workspace can work at the same time with their devices with different parts of the presentation (e.g. three persons can work simultaneously on the beginning, middle, and end of the video presentation 307*a*). All the while, the users will have the ability to toggle their respective display between a view of the overall workspace (scaled accordingly to depict the interaction of all users as in FIG. 2D), a more limited view depicting the object they are working on within the workspace, or a simultaneous view (e.g., in frame view).

The media clips may be stored locally on the devices, or they may be streamed from a remote server to which a device in the editing setup has access rights. The mode of collaboration is determined by the users in accordance with the chosen application they are sharing. While application types may vary, the ability of the users to collaborate in such an interactive, seamless manner promotes an effective overall user experience. It is contemplated, also, that device users having access to applications that are not provided by the other user's respective shared services platform, can share their applications with the other user within the virtual workspace.

Figure 3B:
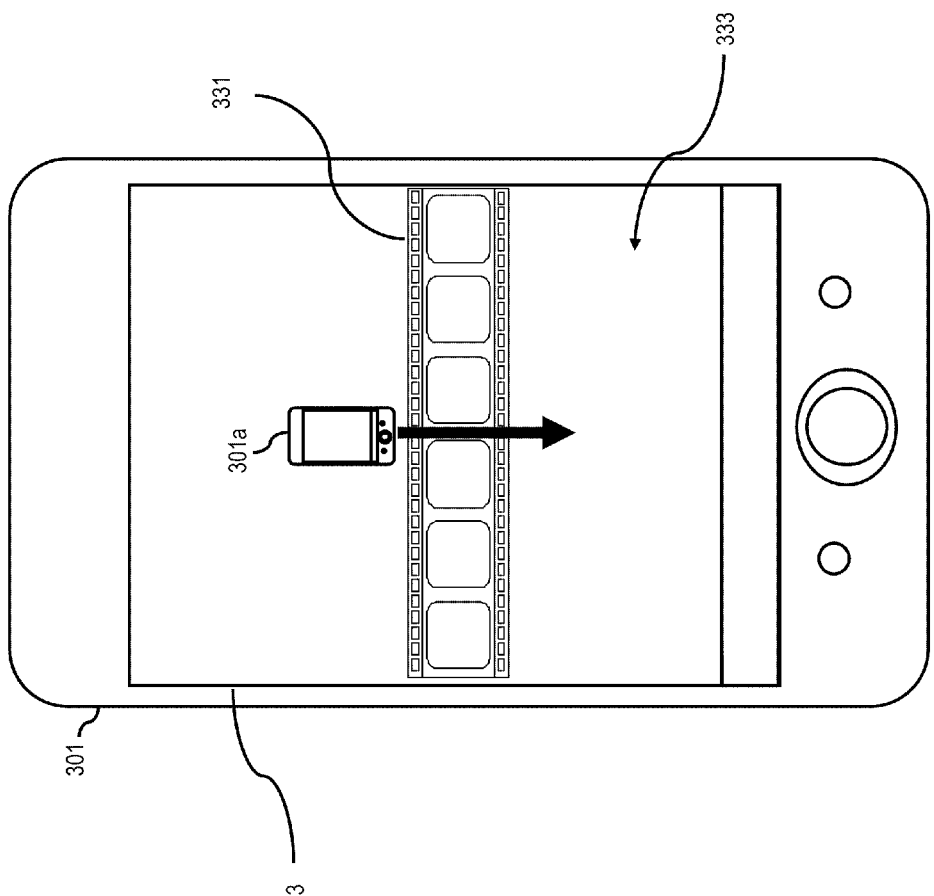

As yet another example implementation of media processing, one or more device users within the shared workspace can splice a video clip as extended across the virtual workspace. FIG. 3B depicts a limited view of the workspace 333 as rendered to a user's device display 303, featuring the video clip 331 upon which they wish to operate. In addition, the workspace shows a depiction of their device 301a, positioned at a certain point in duration of the video clip. As the user moves their device 301 left or right along a surface, the depiction of their device 301a within the workspace 333 also adjusts accordingly. The user can splice the video clip at the point in which their device 301a is positioned by swiping the device through the representation of the clip 331 within the virtual workspace 333. When device is in "portrait" position, it acts as a cutter. Alternatively, when the device is in "landscape" position it lays out video clips and other content to the virtual workspace.

While not shown, yet another media processing implementation can involve sound production amongst devices within the workspace. For example, in each device, the display can be divided into particular areas. Different features are assigned to each area, for example, pads triggering drum sounds. The size and location of the virtual pads can be defined by the user. In particular, the functions assigned to virtual pads that overlap when the devices are stacked are combined when triggered with the topmost device. The sounds are triggered by tapping on the virtual pads on the screen of the topmost device. Changing the order of the devices changes the resulting sound triggered by tapping on the screen of the topmost device. One of the stacked devices may provide background music, on top of which the triggering of the sounds is made to mimic a karaoke format, similar to video games like Guitar Hero® and RockBand®. The sounds that are triggered can be downloaded as service data or be recorded on the spot as sound data resident on the device, prior to use.

In FIG. 3C, another example of media processing capability is depicted. In this case, multiple user devices 351, 351a and 351b having the same time based media (e.g., video) are shown. The same time-based media content (e.g. video) is shown on the different devices 351, 351a and 351b such that there is a constant delay between the clips shown in each device. The distance between respective devices is measured, with the distance from device 351 to 351a represented as distance 361 and the distance from 351 to 351b represented as distance 363. In this example, device 351 is the point of focus (T=0), while the device right of it shows the video ahead by T+40 seconds and the device to the left lags behind T−2 seconds. The benefit of this arrangement is, for example, that the user can watch a section of the same video on another device which they may have missed when viewing the middle device. Users can adjust the delay time by simply adjusting the distance between the devices. Users define the mapping between the delay time and the distance of the devices within the context of the workspace. Within this mapping, which is based on the chosen interaction and connection of devices within the virtual workspace, the participating users decide which device is the point of focus (e.g., which device represents the T=0 media segment). This is of advantage in workspaces configured with 2, 3 or 5 devices. It is noted that this approach allows instant repeat viewing of an event that recently elapsed—i.e., in a TV broadcast—on another device display.

While the example presented with respect to FIG. 3C pertains to modifying a distance of devices within the context of media processing, it is noted that device distance may be implemented as a measure for controlling any parameter within the virtual workspace. By way of example, when respective devices execute calendar applications, increasing the distance between devices may change the calendar view from a weekly view to a monthly view; the increased distance corresponding to the expanded scope of viewing of the calendar. As another example, multiple devices may be linked such that parameters of the devices are controlled simultaneously. Under this scenario, specific device actions manipulated through altering a distance of one device relative to another may also be acted upon the other device.

In certain embodiments, respective devices may be physically positioned to stand upright upon a surface or lay flat upon the surface while maintaining a relative distance from one another. By way of example, when the devices are positioned upright, augmented reality information can be displayed on the respective device interfaces with the rear-facing camera of the devices being configured to capture visual data pertaining to the surrounding environment. Alternatively, the same execution may be performed when the devices lay flat upon the surface but without the capture of environmental data for supporting augmented reality viewing. In both scenarios, the devices may or may not be on the same level, i.e., the plane upon which they rest is angular/ramps downward.

In yet another optional embodiment, eye tracking technology can be employed to detect which screen amongst the plurality of devices 351, 351a and 351b is being watched currently by the user. By way of example, each of the devices 351, 351a and 351b may be equipped with front-facing cameras to implement an unintrusive form of eye-tracking. More specifically, the front-facing camera can be used to capture images of the user. The images can then be analyzed to derive a direction, angle, etc. of the eyes of the user as a means for eye-tracking. It is contemplated that any other means of eye-tracking may be used in the approach described herein. Once a focal point is determined, devices around the focal device delay or advance the video accordingly. Still further, in instances where a single device 351 carrying the media file, direct leftward 359 or forward movement 357 a distance 361 or 363 respectively, the media file is advanced or rewound accordingly.

It is noted that the above described examples can be useful for performing numerous types of media processing, including but not limited to, creating collaborative annotations of videos, performing multi-view video editing (e.g. assembling a single clip of an event like concert or football match captured with several devices), developing karaoke media (i.e., lyrics originate from one device, video from another device).

In another embodiment, when a collaborative, virtual network is established between complimentary devices, another application or service includes image processing. "Image processing" pertains to the means in which devices exchange, execute, edit or otherwise manipulate image data including pictures, graphics, image based documents (e.g., PDFs) and other content within the context of an established virtual workspace. FIGS. 4A and 4B depict an exemplary process for performing image processing.

In this example, devices 401, 403 and 405 are stacked upon one another for the purpose of generating a collage. Device 401 has access to the desired background image 411, while device 403 has access to the foreground image 413. In this example, the background image is a portrait and the foreground image is a frame that includes a masked area (e.g., a blue/green screen) in which the background image can show through. Objectively, the resulting overlay of these images 415a is to be rendered to currently blank screen 415 of device 405. The basic principle is to stack devices on top of each other as shown in FIG. 4a, in a manner that enables the images to be stitched together, such as by a collage generations application available for use by devices within the virtual workspace. The areas to be included from each image in the resulting collage can be drawn on touch screen of the device displaying that image.

In keeping with the example, device 401 possessing the background image 411 is placed on the bottom. It is then mated (e.g., detected by CPS 115 and aligned appropriately within the context of the overall workspace) with the second device 403. The third user device in the stack 405 renders to its interface a depiction of the final collage view 415a. Hence, the order of the separate images appearing in the collage is determined by the order in which the devices are stacked. The image on the lowest device in the stack becomes the lowest layer in the collage.

An alternative implementation is to create the collage by manipulating the spatial relationship between devices rather than stacking them atop one another. As such, the collage photo is created through defining the distance between the separate elements as shown on different devices, perhaps positioned in a standing mode or alternatively a side-by-side orientation. Manipulation of the distance between devices creates depth (blur) to an image. Cropping of image elements can be performed by moving the device as well. So, for example, in the composite image 415a resulting from the combination of images 411 and 413, the original size of 413 is modified. This modification occurs as a result of adjusting the distance between devices 401 and 403, such that image 413 is eventually depth reduced to appear as image 413a.

Figure 4D:
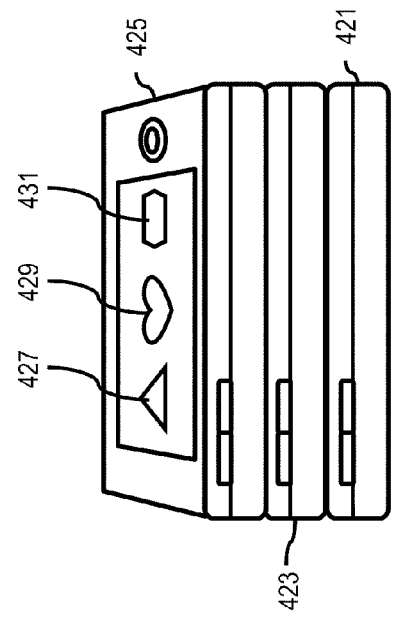
FIGS. 4C and 4D are diagrams of user equipment positioned relative to one another to enable sharing of data, according to various embodiments.

It is noted that the above described examples can be useful for performing numerous types of image processing, including but not limited to, creating collaborative annotations of images, generating scrapbooks, performing simultaneous picture enhancement, photo editing, etc. It is noted that the image processing technique presented with respect to FIGS. 4A and 4B is but one approach to data combining, sharing and exchange. In various embodiments, the aforementioned positioning of devices (e.g., stacking of devices) for the purpose of combining, altering or controlling data on respective devices is presented further with respect to FIGS. 4C-4F.

Figure 4C:
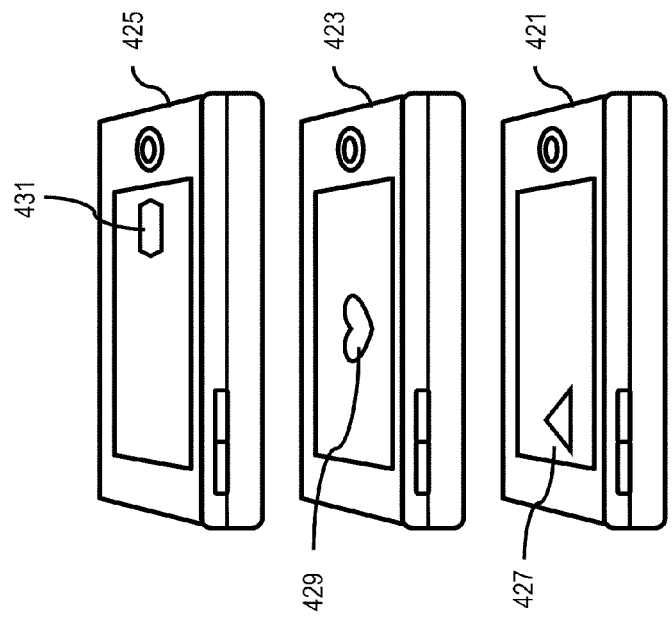

FIGS. 4C and 4D are diagrams of user equipment positioned relative to one another to enable sharing of data, according to various embodiments. By way of example, as in the above described image processing approach, two or more devices 421-425 may be stacked (i.e., placed on top of each other) to combine all data or only selected data items from specific folders of respective devices. By way of example, UEs 421-425 of FIG. 4C feature data 427-431 respectively. Though depicted in this example as physical objects appearing on respective user interfaces of the UEs 421-425, it is noted that the data may be a data file, text, glyph or any other information capable of being processed or rendered to the display. In addition, the data may be that which is stored locally on each UE 421-425, or may originate from a remote server that is accessed by one or more UEs.

In certain embodiments, when stacked, the data 427-431 of respective UEs 421-425 is made to be combined. Resultantly, the combined data 427-431 is made to appear to the user interface of the topmost device 425, as depicted in FIG. 4D. Having combined the data 427-431, a change made to the data from the topmost device 425 is translated across all the other devices 421-423 in the stack. By way of example, if a user of the topmost UE 425 deletes data 431, this same deletion of data is made to the other UE 421-423. Aside from deletion, changes made to the data may include moving or adding a file from a folder/directory, editing and subsequently saving a revised document, uncompressing a folder containing various additional files, opening or closing a document to enable review of its contents, renaming a document or manipulating its associated metadata (e.g., tags, category, title), etc. In addition, changes made to an application as rendered to the graphical user interface on the topmost device 425 may also correspond to changes in the other devices 421-423, such as the opening of a word processing application resulting in the opening of the same application on all other devices 421-423 in the stack. Likewise, the minimizing or moving of a particular application window on the interface of the topmost device 425 may be translated to the other devices 421-423. It is noted, therefore, that stacking of UEs initializes a data sharing connection between devices—i.e., by virtue of the connectivity and positioning sensors (CPS). The connection, once established, can remain active even after one or more of the UEs 421-425 is removed from the stack.

FIGS. 4E-4F are diagrams of a user interacting with user equipment to affect how data is shared between respective user equipment, according to various embodiments. By way of example, for UEs 421-425 connected due to their positioning (e.g., stacked), the topmost UE 425 features a folder icon/object 433 that overlays folders on UEs 421-423. To enhance user interaction, the folders may appear as separate layers on the user interface of the topmost device so they can be flicked though and switched between by the user's finger 435 or with a stylus. Under this scenario, the user selects which file to copy from the topmost UE 425 to the other UEs 421-423 by punching or tapping the folder icon/object 433 with their finger 435. The punching or tapping motion, performed in conjunction with the stacking of UEs 421-423, is recognized programmatically and by the connectivity and positioning sensors (CPS) as a command for sharing the folder with UEs 421-423 at the bottom of the stack. Alternatively, the user may copy the folder 433 as represented on a layer for the bottom device 421 to the topmost UE 425 by pushing with their finder 435. This pushing action may be presented graphically as a pop-up or spring-like motion of the folder icon/object 433 from the bottom layer to the topmost layer for presentment to UE 425. Optionally, this action may be configured to enable copying of the file to the intermediate UE 423 as well.

In certain embodiments, as presented with respect to FIG. 4F, the file icon/object 433 is dragged by the user's finger 435 in a direction 437 to a dedicated "hole" widget 439. The hole widget 439 is configured as a interface between respective stacked UEs 421-423 for allowing data to be passed. By way of example, upon dragging the folder icon/object 433, it may be presented as falling from the topmost UE 425 to the bottom UE 421. Correspondingly, the folder 433 may then be represented as corresponding to the bottom layer. More regarding the configuration and arrangement of virtual layers representative of connected UEs is discussed later.

Figure 4G:
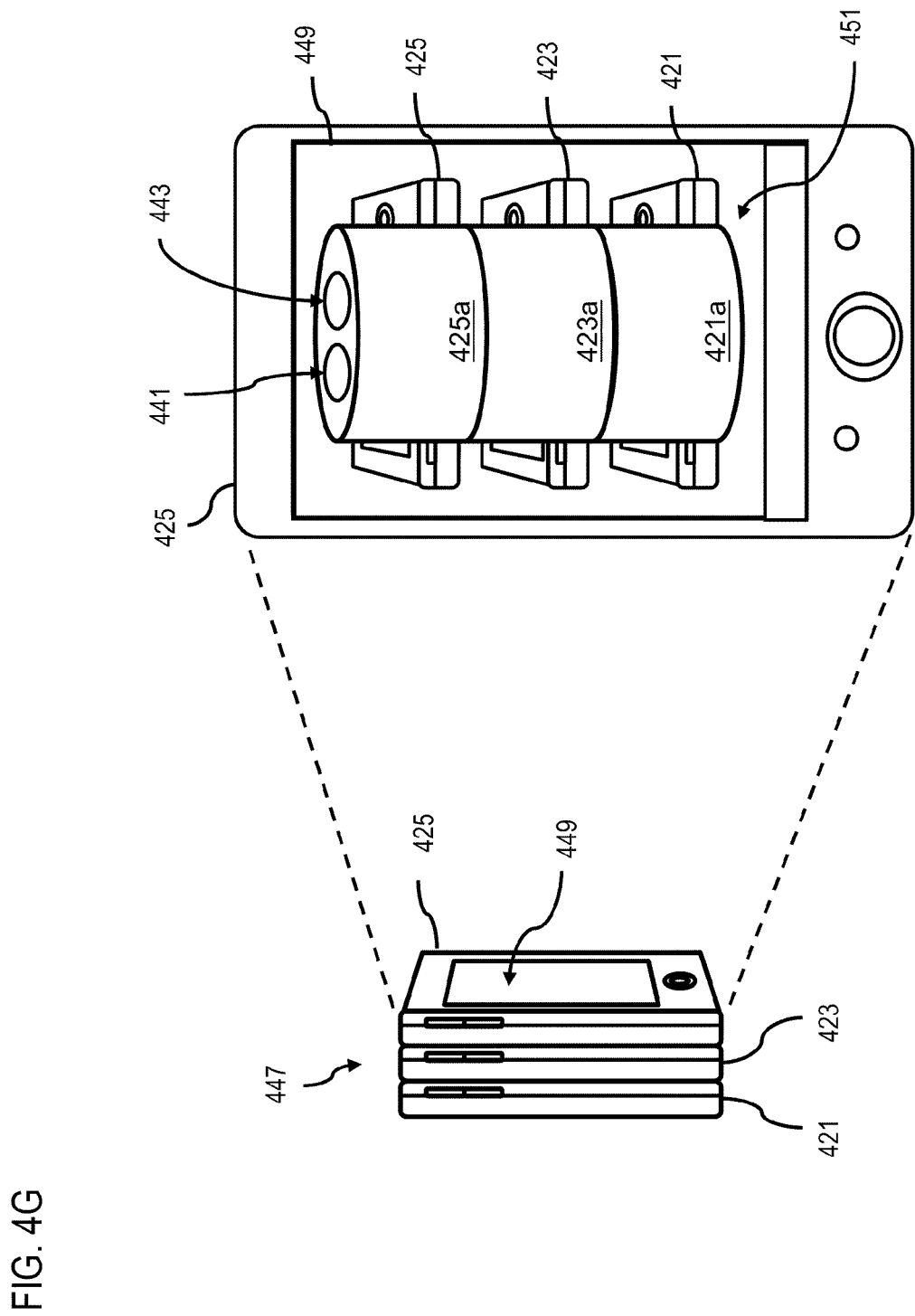
FIG. 4G is a diagram depicting the user interface of user equipment for representing the sharing of data between respective user equipment within a virtual workspace environment, according to one embodiment.

FIG. 4G is a diagram depicting the user interface of user equipment for representing the sharing of data between respective user equipment within a virtual workspace environment, according to one embodiment. When UEs 421-425 are stacked (e.g., stacked devices 447) or otherwise positioned and oriented for establishing connectivity between them, the files contained in folders on respective devices 421-425 may be combined into a shared folder that appears in the virtual workspace environment. By way of example, the visual representation of the shared folder can be a cylinder 451 or other object for displaying data contents visually and openly. The cylinder 451 may appear on the user interface 449 as a virtual overlay within an augmented reality view, where the cylinder 451 overlays a graphic representation of the stacked devices 421-425.

Under this scenario, folders containing different types of files, e.g. music and photos, may be presented as separate silos 441 and 443 depicting those file types within the cylinder 451. In addition, the cylinder 451 can be divided into separate stacked sections 421a-425a, with each section corresponding to a stacked UE 421-425 respectively for representing its data contents—i.e., section 425a depicts the file contents of the topmost device 425 of the stack 447. It is noted this approach allows users to visually access the file contents of the stacked devices 447 for enabling more convenient file sharing. Also, it is further noted that cylinder 451 may display associated statistical information about the combined folders, such as information specifying how many copies of the same file or folder each user has on a device (e.g., to avoid duplicate sharing of files), file sizes relative to available memory for a particular UE, file types that are compatible or incompatible with a given UE, discrepancies in sizes between files of the same name and type, etc. As before, once the connection is established between the UEs 421-425 from being stacked 447 or otherwise positioned to formulate a connection, the cylinder 451 can be rendered to a given UE even after they are removed from the stack 447.

In another embodiment, when a collaborative, virtual network is established between complimentary devices, another application or service they can perform includes data sharing and networking. "Data sharing and networking" pertains to the means in which device users exchange, edit or modify data they have access to for the benefit of themselves and others within a collaborative, virtual workspace environment. A general depiction of the process is presented in the flowchart of FIG. 5A, and depicted further in FIGS. 5B-5H.

Figure 5A:
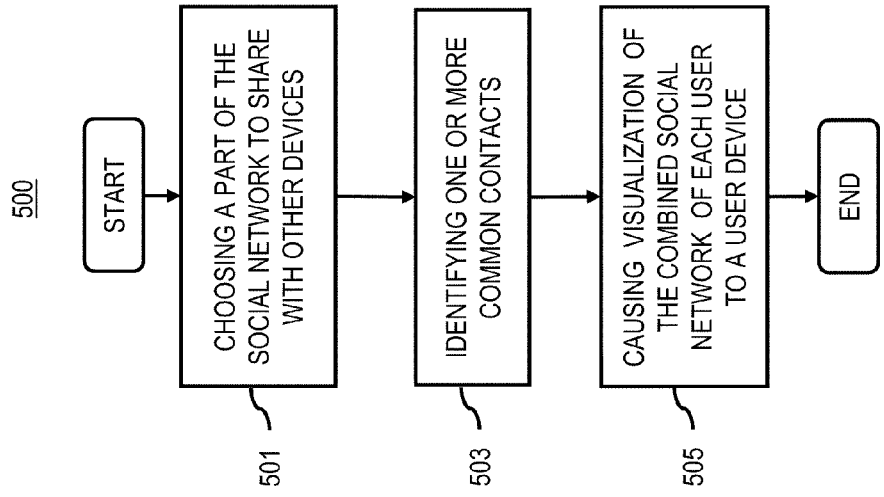
FIG. 5A is a flowchart of the process is by which several user equipment collaborate to perform data sharing and networking within a virtual workspace environment, according to one embodiment.
Figure 5B:
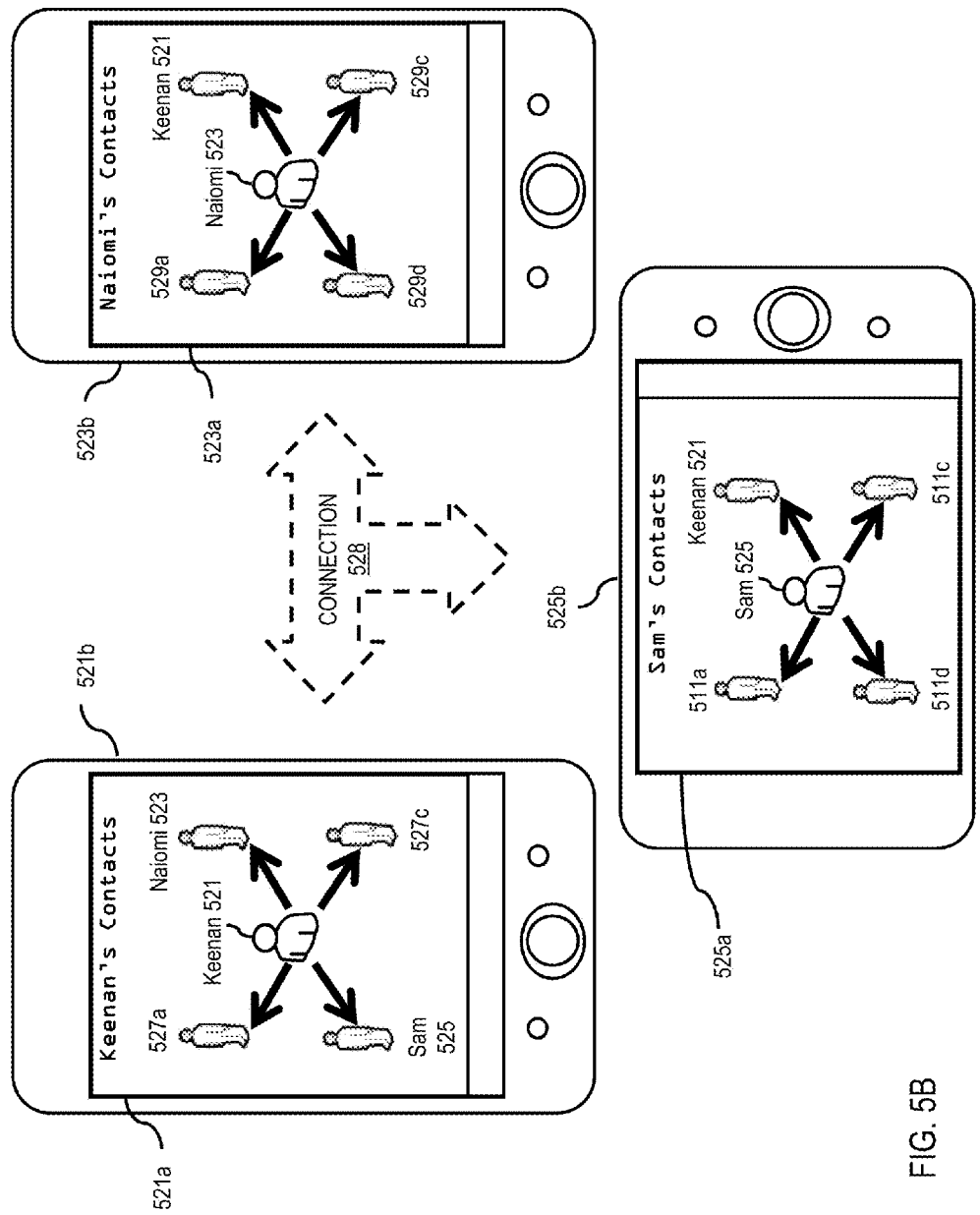

FIG. 5A is a flowchart of a process for sharing data over a virtual workspace environment, according to one embodiment. By way of example, the virtual workspace manager 115 performs the process 500 and is implemented in, for instance, a chip set including a processor and a memory as shown in FIG. 8. In addition or alternatively, all or a portion of the process 200 may be performed by the shared services platform 103. The process 500 of FIG. 5A is described with respect to the diagrams of FIGS. 5B-5H. As shown in FIG. 5B, three devices 521b-525b belonging to different users are shown displaying a selected group or portion of their social contacts in their respective displays 521a, 523a and 525a. This corresponds to step 501 of the process 500. Returning to FIG. 5B, for the first device 521b, the user display 521a presents a visual depiction of their network showing themselves in the center as Keenan 521. Extending outward by way of arrows (relational indicators) are affiliated contacts 527a and 527c, who at the moment are not users operating within the virtual workspace as established via the connection 528 between all three devices 521b-525b. Users Naiomi 523 and Sam 525, who are currently operating within the virtual workspace by way of devices 523b and 525b respectively, are indicated to user 521 as such (e.g., highlighted in some fashion). In this example, all of the contacts are presented in similar fashion with the exception of the user in question 521, whose orientation is to the center of the network and whose graphical representation is different than all other users.

A depiction of the various social networking relationships between users is shown for users 523 and 525 as well. In the case of the user Naiomi 523, in addition to sharing a relationship with Keenan 521, her contacts include users 529a, 529c and 529d. Sam's 525 also shares a relationship with Keenan 521, as well as relationships with users 511a, 511c and 511d. Again, the user in question is depicted in this example as centered within the network, having a differing graphical representation, with relational indicators (e.g., arrows, connectors) extending outward to reveal other relationships. Within the context of the collaborative networking environment, a "contact" to which a user may connect refers to any data generally providing a profile, background/bio, address, phone number, threaded message or any other useful information pertaining to a particular person or entity of interest. Associated with a particular contact may also be content such as documents, images, applications and the like. Each user can access and select their contacts from one or more shared services platforms, e.g., Facebook or MySpace. Alternatively, the users can select from a locally residing contact management application, such as ACT or Outlook. Combinations of various sources may also be selected.

Figure 5C:
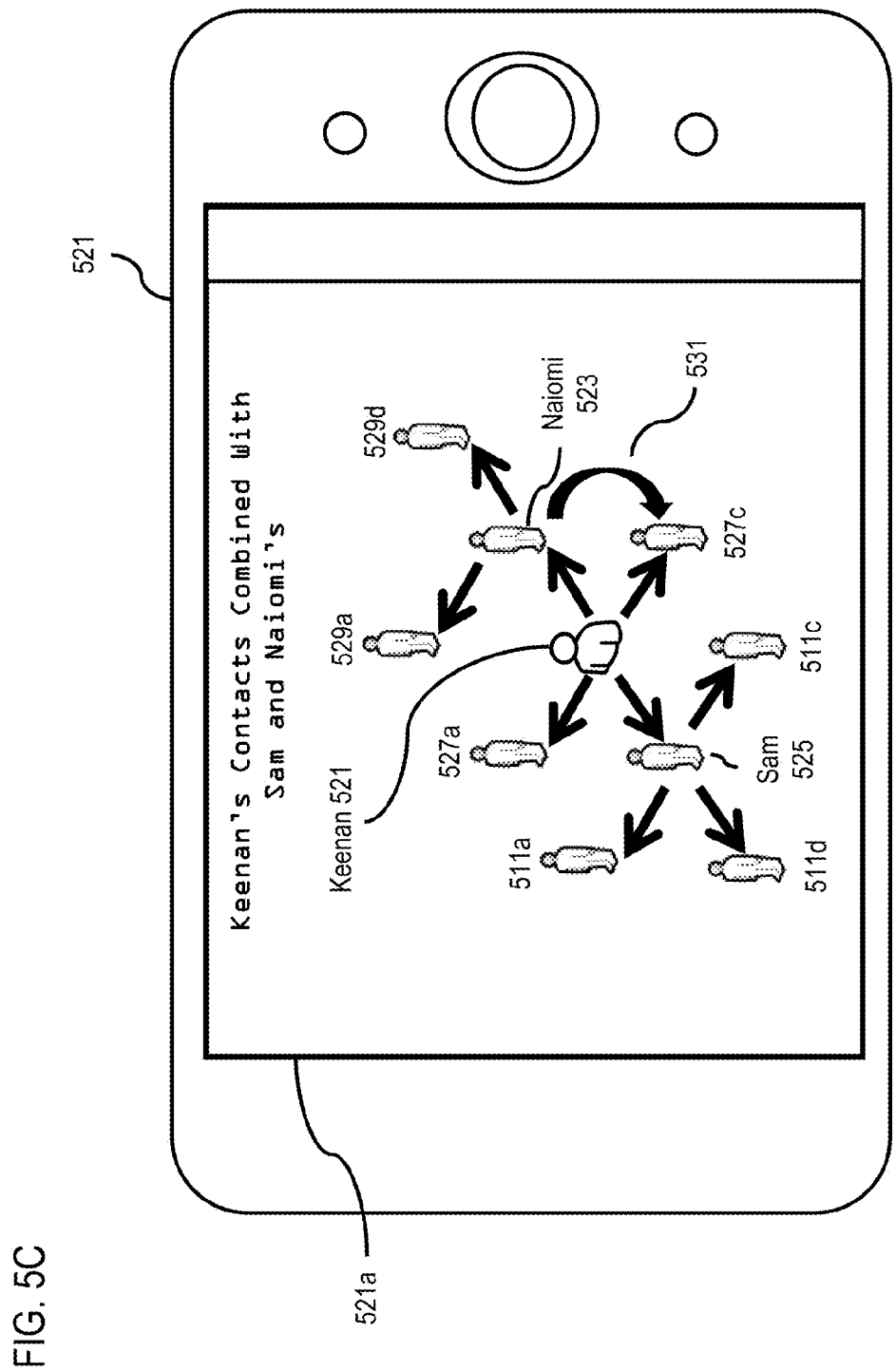

Given the common relationships between users 521, 523 and 525 operating within the workspace, the shared services platform in combination with the virtual workspace manager 115 for a given device can perform a check can to identify the common contacts from amongst the selected social networks. This corresponds to step 503 of the process 500. In another step 505 of the process 500, a combined representation of the social network based on the selected contacts of each user is presented to each display 521a, 523a and 525a. FIG. 5C depicts a representation of the combined social network from the perspective of user device 521b belonging to Keenan 521. In this example, the contacts associated with Sam's 525 social network as well as Naiomi's 523 are shown in combination with Keenan's 521. Resulting from the combining of data and the identification of common contacts amongst users (steps 503 and 505), an arrow/connector 531 is added to the combined network to reflect the known common relationship between Keenan 521, Naiomi and user 527c. Use of the connector prevents duplication of the representation of user 527c (which is common to both other users).

The result presented in this example is a visual depiction for Keenan 521 of the mutual connections between respective contacts within the network. In instances where the combined social network is too extensive, different parts of the network can be shown by moving the devices in an augmented reality view. Also, the visualization of the combined social network for users Naiomi 523 and Sam 525 will be essentially identical to that shown in FIG. 5C. The only modification will be the positioning of the user in question within the center of the social network and the adapted image intended to distinguish said user from all other contacts. In addition to featuring the combined representation, each device may also show the user's individual social network in a split-screen mode. Still further, the devices may present different visualizations (including zoom levels) to the social networks. Having been generated in combined form, the resulting social network data (e.g., contacts) can also be stored to a contact management system operable by the device.

In various embodiments, the combined social network can identify and propose the addition of common users to a given user's network, as depicted in FIG. 5D. In this example, the shared services platform 103 enabling sharing and combining of network data identifies users Keenan 521 and Naiomi 523 both have user 527c in common within their network. It further identifies, however, that Sam 525 does not. Based on these relationships, the virtual workspace manager 111 can propose the user 527c be added to the social network of Sam 525, given the mutual affiliations inherent with other contacts. If Sam 525 accepts the proposal, user 527c becomes part of his social network and a connector/arrow 551 is shown to designate the mutual connection. This connection will remain even after the combined social network has been split by the un-stacking, removal, out or range movement, logging off, or any other means of ending the devices relationship with the virtual workspace. Thus, the combined network is a tool for identifying potentially interesting contacts that one's friends already have.

In various embodiments, the combined social network can specify the types of social ties between the users and render this detail for display to the interface. For example, if users Keenan 521 and 527*c* are golf pals, as indicated within the contact details profile, this detail 555 is displayed. Similarly, if Naiomi 523 and user 527*c* are cousins, this detail 553 is rendered to the display. As such, Keenan 521 can decide if he wants to revise the social tie as current indicated between him and user 527*c* based on the intelligence revealing that Naiomi 523 and user 527*c* are cousins. Perhaps, under the circumstances of this example, Keenan 521 can decide that user 527*c* is now considered a closer friend than just a golf pal and can update the profile of said user accordingly.

Figure 5E:
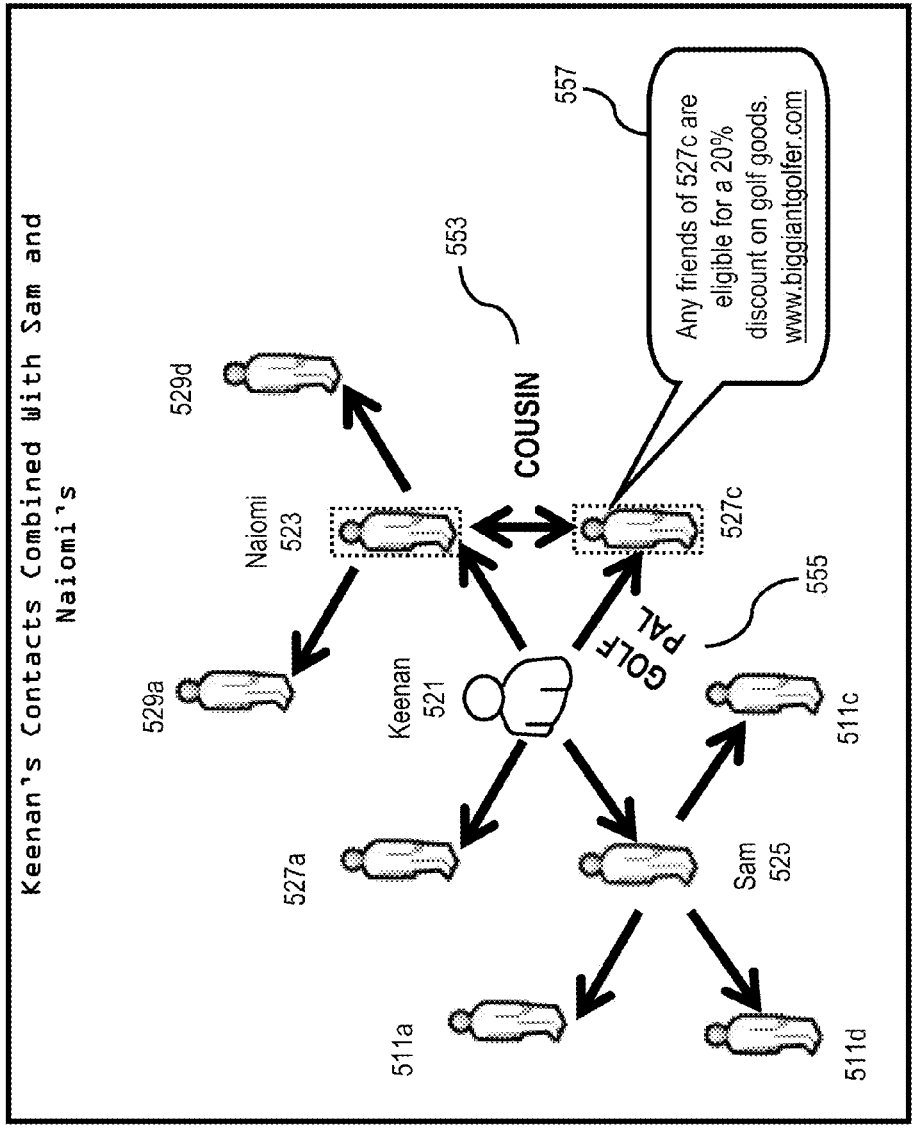

In various embodiments, the combined social network can identify opportunities for common benefits to be shared or offered to users as shown in FIG. 5E. For example, user 527*c* sells sporting goods and golf equipment via his store Big Giant Golfer (www.biggiantgolfer.com). Because Keenan 521 and user 527*c* are golf pals, user 527*c* will give a 10% discount to Keenan on any goods purchased at his store. User 527*c* and Naiomi 523 are cousins, and thus user 527*c* gives Naiomi 523 a 20% discount on merchandise. When the separate social networks are combined, however, common acquaintances can be identified by all users 521-525. All users are now made aware through interaction within the virtual workspace and during a shared services session that they can together buy computer equipment from User B at a 20% discount. The system identifies and presents this opportunity to all the interacting users as a callout notification message 557 or the like.

Figure 5F:
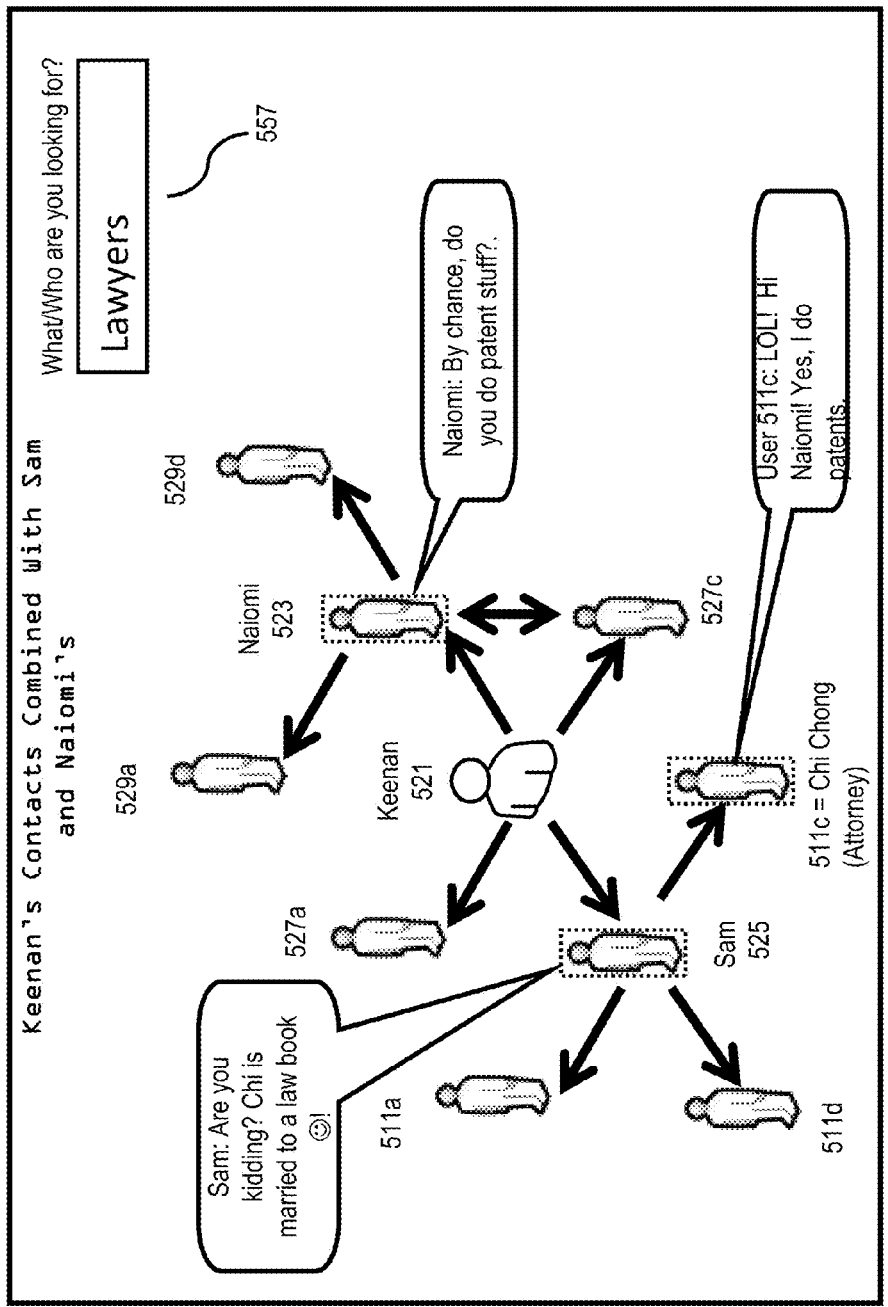

In various embodiments, the combined social network can be used to identify contacts within a shared social network. For example, FIG. 5F presents an exemplary scenario wherein Naiomi 523 is looking for a good lawyer. Naiomi 523 can perform a search using the keyword 'lawyers' by way of a social network search engine 557 (the search is initially directed to the present combined social network). In this example, the search reveals that Sam 525 has a lawyer in his network of contacts. Naiomi can now ask Sam 525 for a recommendation about the lawyer, in this case user 511*c*, identified as Chi. Still further, a chat application can then be initiated by the system 100 on top of the social network visualization, with Naiomi 523, Sam 525 and recently engaged user Chi 511*c* participating.

In various embodiments, the combined social network can be used to group contacts on the basis of hierarchical or social distance level. Within the context of a social networking environment, "social distance or hierarchical level" refers to the grouping of contacts on the basis of whether they are directly or indirectly related to or connected with a given user. For example, FIG. 5G presents an exemplary scenario wherein Keenan 521, Naiomi 523 and Sam 525 are all direct to one another and thus are friends belonging to the same level. Friends-of-friends, however, as indicated via the dashed rectangular sections belong to another level. Still further, these next level contacts belong to yet another level, as indicated via the dashed oval section of the FIG. 5G. It is noted that when the social networks of two or more people are combined, the different levels of people in the combined social network can be shown in groups on different on the same display, categorized by level, or on different displays of respective complimentary devices (e.g., Keenan, Naiomi and Sam's devices 521*b*, 523*b* and 525*b* respectively). The latter is presented with respect to FIG. 5H, which depicts the exemplary interface with the various contacts represented by social level.

Same level contacts are shown in the category entitled "We" 559 and include contacts Keenan 521, Naiomi 523 and Sam 525. First level contacts, namely friends, are shown in the category entitled "$1^{st}$ Level" 561 and include contacts corresponding to users 529*a*, 527*a*, 511*a*, 511*d*, 511*c*, 527*c* and 529*d*. These are all of the contacts grouped within the dashed rectangular sections of FIG. 5G. Second level contacts, namely friends-of-friends, are shown in the category entitled "$2^{nd}$ Level" 563 and include contacts corresponding to users 529*b* and 511*b*.

Figure 5H:
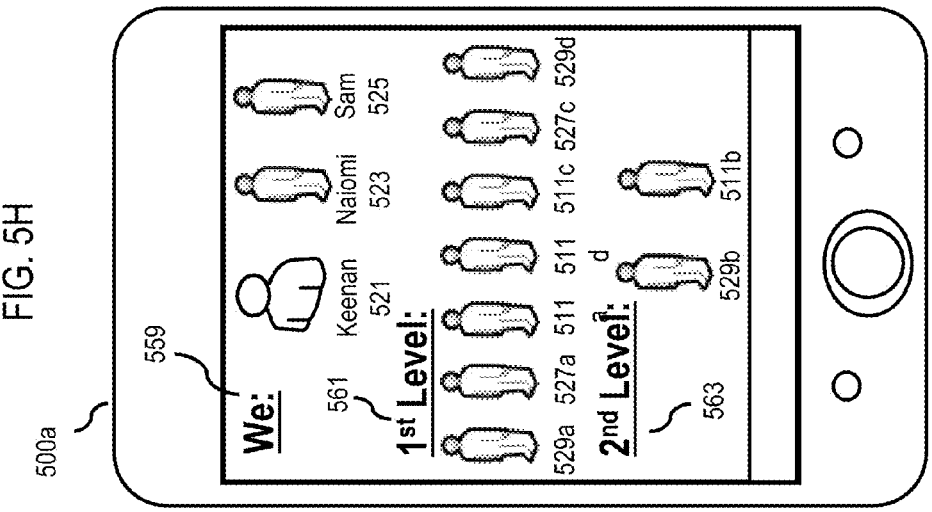
Figure 5G:
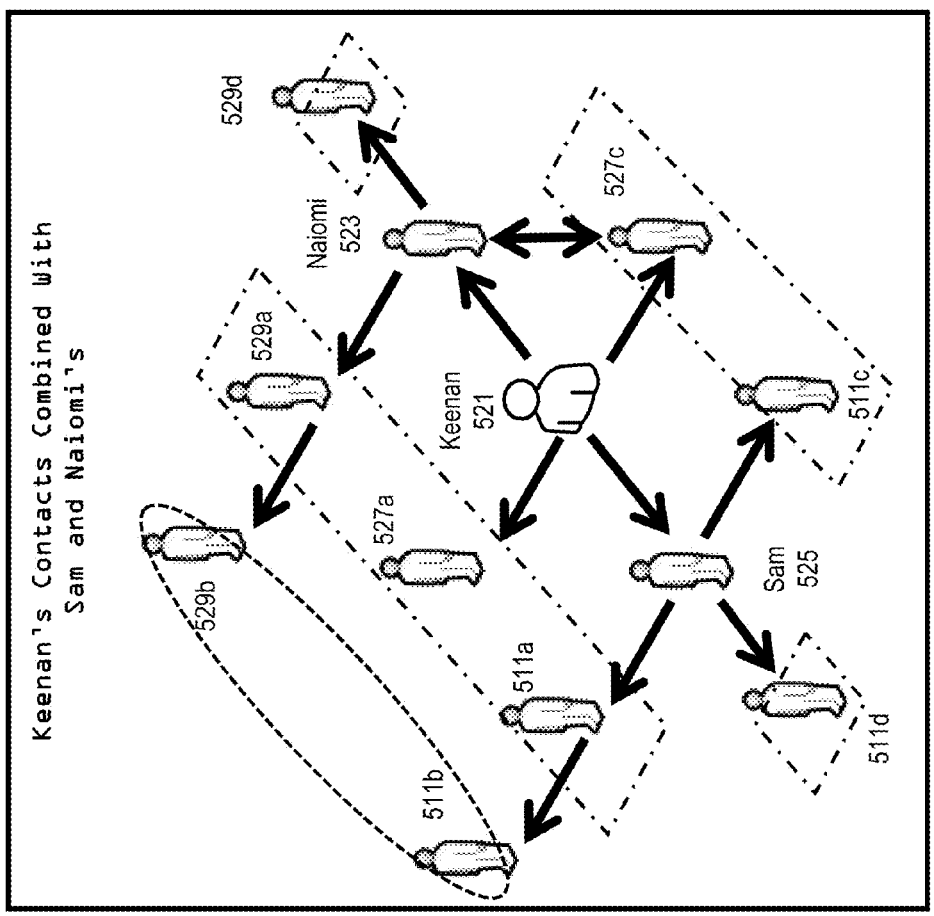

Alternatively, rather that the consolidated view shown in the FIG. 5H, the various categories or levels of contacts can be shown on the different displays of user devices 521*b*, 523*b* and 525*b*, where a different level is presented to each interface. For example, Keenan, Naiomi and Sam's devices 521*b*, 523*b* and 525*b* respectively can present "We" 559, "$1^{st}$ Level" 561 and "$2^{nd}$ Level" 563 respectively. Regardless of implementation, different information searches or manipulations to the different groups of people can then be performed through each device as they interact within the shared virtual workspace. It is noted that this same approach can be readily utilized in the context of a shared services platform for genealogy/family tree creation, an organizational chart generation service, a multi-level marketing tool or any other application where the dynamic relationships amongst shared contacts can be leveraged within a collaborative network environment. Taking for example the concept of genealogy, several cellphone enabled family members meeting together at a family reunion, whether they are socially close or disparate, could formulate a virtual workspace, access the shared services platform through which the genealogy application is shared and then interactively and easily generate or update the family tree (the more family members having a network accessible mobile device, the better for establishing genealogical linkages).

In the examples presented above respective to applications for data sharing and networking, the various exemplary implementations can be initiated by stacking the devices on top of each other. Thus all the users' social networks may be combined. An alternative method is to allow users to select which parts of their social networks (either from all used services, or only from selected individual services like Facebook®, LinkedIn®, Plaxo®) they want to combine by placing different parts of the social networks to different parts of the device screen (e.g., Friends Group to upper right corner, Colleagues Group to lower left corner). When the devices are stacked fully or partially on top of each other, different parts (groups) of the users' social networks are combined and visualized to the adjoining user devices display and vice versa. This is similar in approach to the image processing consideration presented in FIGS. 4A and 4B (collage creation) but with different content and intent.

When the devices are placed on top of each other, two or more devices can determine (e.g., through Bluetooth LE and the necessary extensions) each others' precise locations and how the screens of the devices overlap, as discussed with respect to the connectivity and positions sensor application of FIG. 2B. This information can be used in one embodiment of the invention so, that only the parts of the social networks appearing on the screens that physically overlap, are combined. As the devices are moved, different combinations of partial social networks are shown.

In certain embodiments, another application or service that can be supported by a virtual workspace relates to providing for "social control" of a common function. More specifically, social control enables one or more devices participating in a virtual workspace to create a virtual "controller." For example, when the devices are co-located or other organized into a virtual workspace or network, the users of the devices can specify and agree on what specific function is to be performed or controlled by the devices via the virtual controller. For example, the users may reach an agreement on a function such as regulating the volume of music in the location by controlling a speaker at a particular location, or controlling the color or brightness of lights at a common location via the controller. It is contemplated that the virtual controller may be used to control any function accessible over the communication network 105.

In certain embodiments, the devices may be stacked on top of each other to define a virtual workspace including the virtual controller. The connection between the devices, and thus the social control functionality, can remain active even when the devices are no longer stacked. Thus, as presented before, stacking can be just used to initialize the social control functionality between the devices and whatever properties or functions that can be controlled. For example, the parameter or function to be controlled can be agreed upon between devices by stacking the devices momentarily or in other ways having the devices touch or come within proximity of each other.

In certain embodiments, the devices need not be stacked physically on top of each other to initialize the social control functionality. For example, if the devices are already part of a virtual workspace, each user of the participating devices may indicate an intent to create a virtual controller by a movement of the respective device or a gesture on the device with respect to the virtual workspace. The user may indicate the intent, for instance, by a flicking motion such as a motion to simulate throwing one or more playing cards onto a playing table. The flicking motion can represent a virtual stacking of the devices. The virtually stacked devices then form a group for social control. It is noted that the virtually stacked devices can be seen through the virtual workspace (e.g., through an augmented reality view).

In certain embodiments, devices need not specify the common parameter or function explicitly. Instead, the common function to be controlled may be defined on the basis of the context of the devices or the corresponding users. For example, if the users are on a conference call, stacking the devices may enable controlling of the volume of the conference call.

In another embodiment, each device that is part of the social control group may control both a common function and respective equivalent functions associated with the individual devices. For example, when controlling the volume of a common speaker, speakers associated with each device may also be controlled in tandem with the common speaker.

Figure 6:
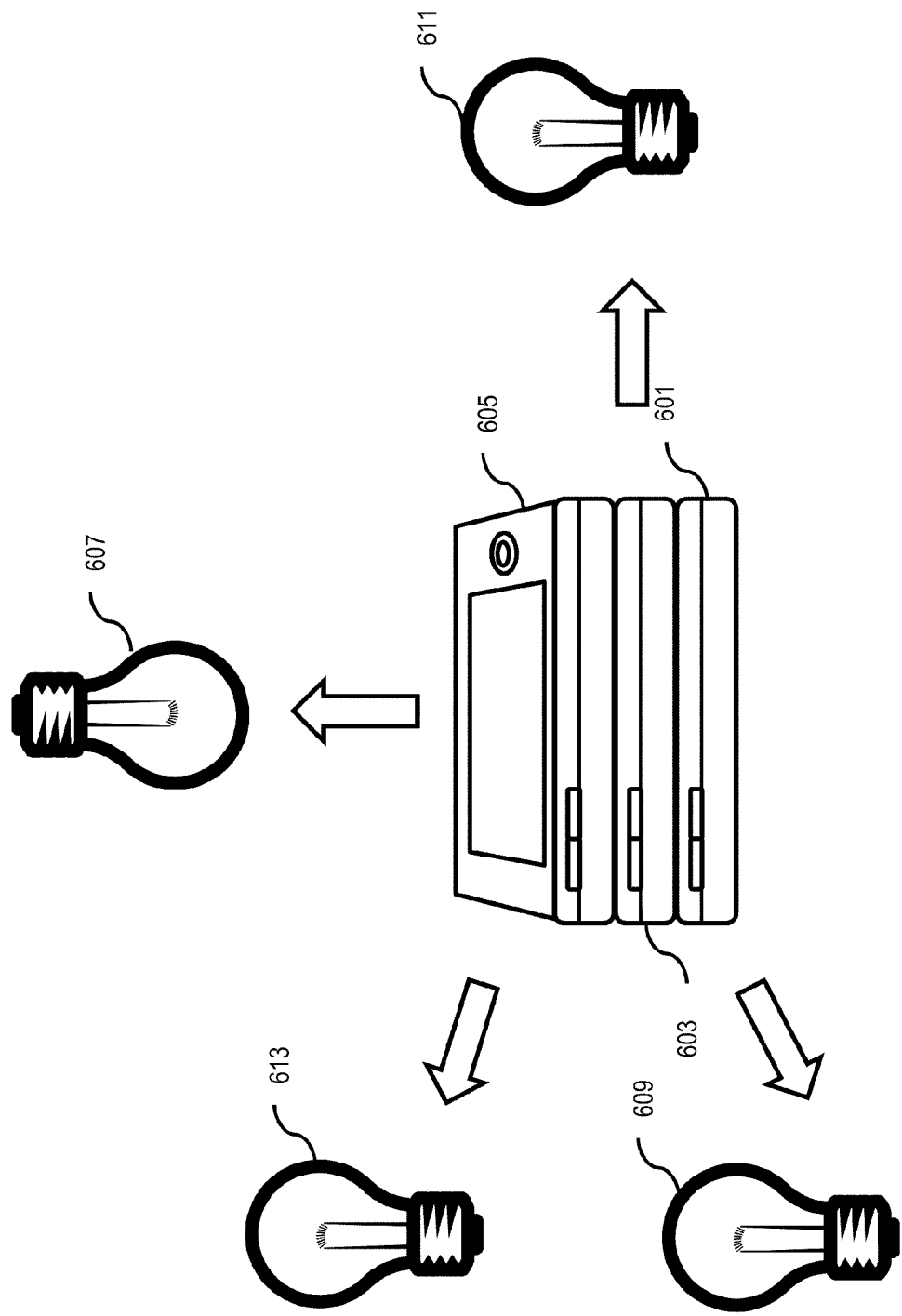
FIG. 6 is a diagram of user equipment interacting to form a social control group, according to one embodiment.

FIG. 6 is a diagram of user equipment interacting to form a social control group, according to one embodiment. In the example of FIG. 6, devices 601, 603, and 605 are stacked by users sitting around a table in a bar. The users have an opportunity to control the color of the light 607 that is located above the table. The stacking of the devices 601-603 initializes the social control functionality to provide a virtual controller to specify the color of the light 607. Through the screen of the topmost device 605, the users select that they want to control the color of the light 607. The users control the color by, for instance, rotating the stacked devices clockwise or counter-clockwise. For example, the users rotate the stack so that the color of the light 607 is blue.

In addition, each of the devices 601-603 has connectivity to the lights 609-613 located in, for instance, the respective users' homes. The users agree that they want to share the blue light to their respective homes by making a movement, making a gesture, activating a button, or the like, or any combination thereof. Accordingly, each of the devices 601-605 signals their respective home lights 609-613 to display the blue color.

The processes described herein for enabling collaborative tasks to be performed more efficiently by mobile device users by enhancing the workspace in which they interact may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
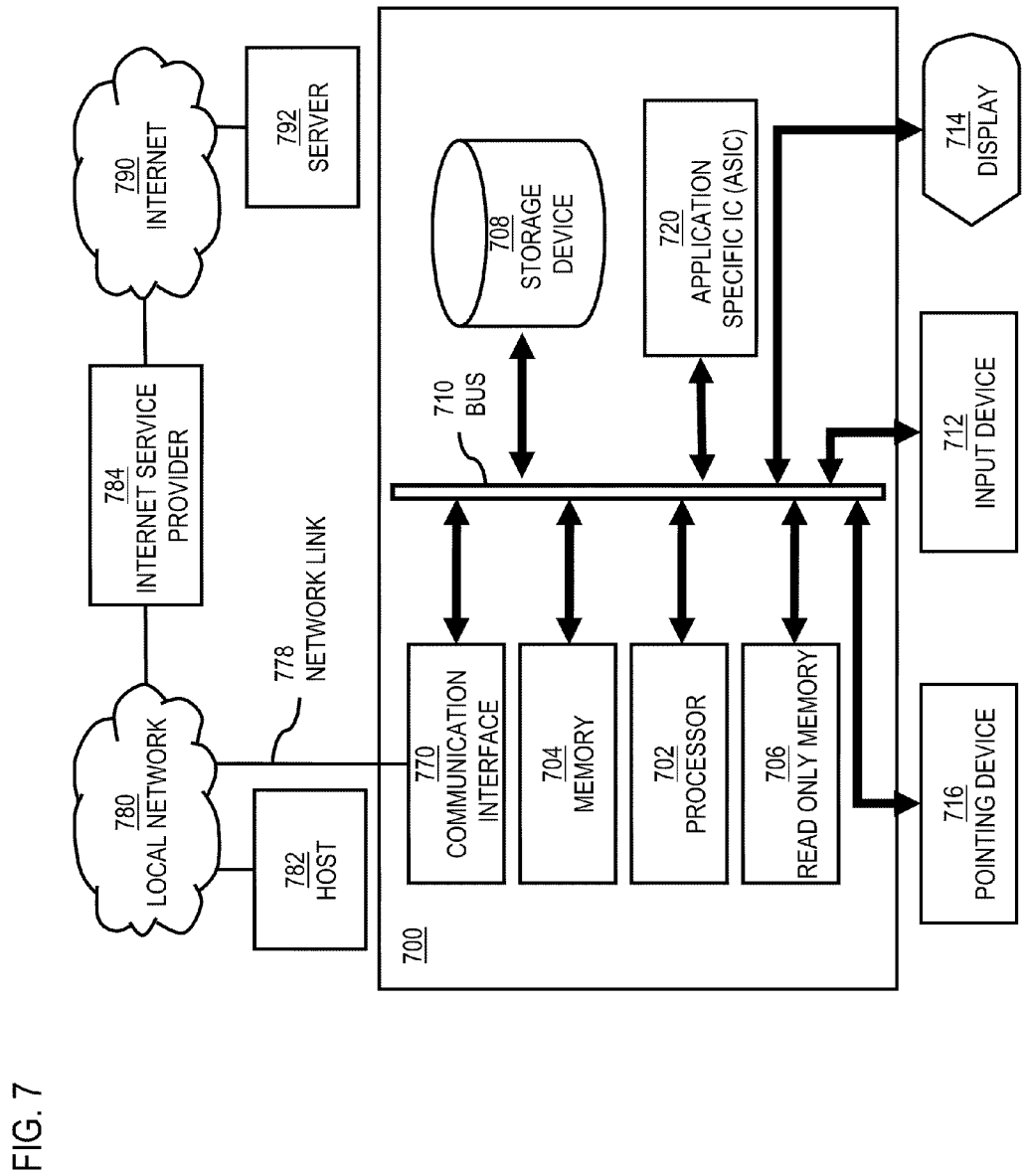
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide seeded modeling of user interests as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing seeded modeling of user interests.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide seeded modeling of user interests. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing seeded modeling of user interests. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing seeded modeling of user interests, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 223 for providing seeded modeling of user interests to the UE.

The term "computer-readable medium" in certain embodiments refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide seeded modeling of user interests as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of providing seeded modeling of user interests.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide seeded modeling of user interests. The memory 805 also stores the data associated with or generated by the execution of the inventive steps.

Figure 9:
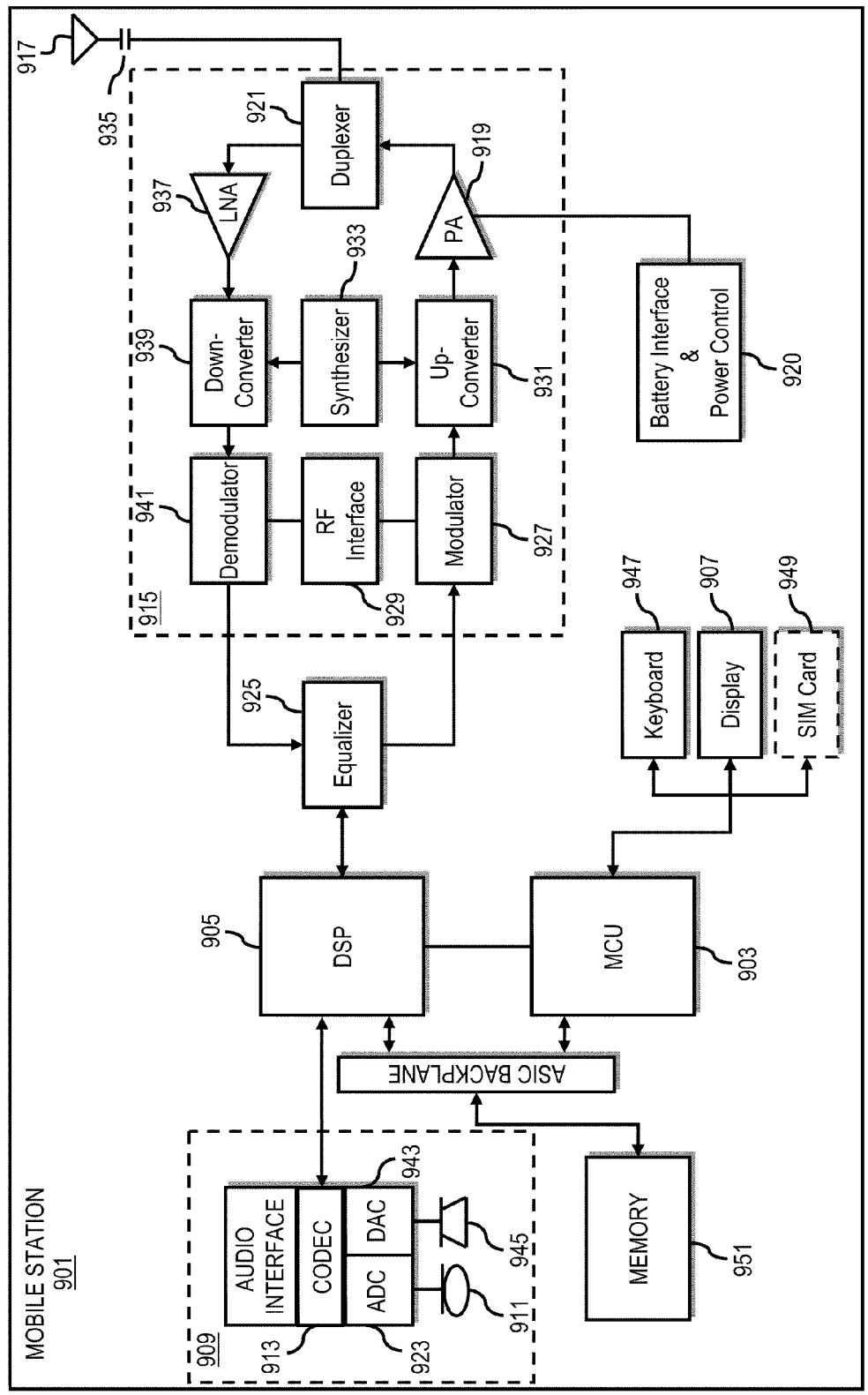
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating communication network 223, according to one embodiment. In some embodiments, mobile terminal 900, or a portion thereof, constitutes a means for performing one or more steps of providing seeded modeling of user interests. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing seeded modeling of user interests. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide seeded modeling of user interests. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    determining to detect location information associated with a plurality of devices;
    determining to monitor movement of one or more of the devices relative to one or more other devices of the plurality of devices;
    determining, by a processor, to create a virtual workspace represented by the movement and/or the location information of the plurality of devices, wherein the virtual workspace corresponds to one or more applications, one or more services, or a combination thereof common to the plurality of devices; and
    determining to cause, at least in part, a sharing of data from at least one of the devices based, at least in part, on the movement and/or the location information of the plurality of devices.

2. A method of claim 1, further comprising:
    determining to combine the shared data and data from at least one other of the devices based, at least in part, on the location information, the movement, or a combination thereof; and
    determining to cause, at least in part, a translation of one or more modifications to the combined data at a topmost device of the stack to another device of the stack.

3. A method of claim 1, further comprising:
    receiving a request to store state information associated with the devices, the virtual workspace, the one or more applications, the one or more services, or a combination thereof;
    determining the state information based, at least in part, on the location information, the movement, or a combination thereof; and
    determining to store the state information, wherein the state information enables restoration of the virtual workspace.

4. A method of claim 1, wherein the movement of the one or more devices includes a movement along a plane of the virtual workplace, a movement in or out of the plane of the virtual workplace, a rotation of the one or more devices, a stacking of the one or more devices, an alignment of the one or more devices, or a combination thereof.

5. A method of claim 1, wherein the one or more applications or the one or more services include media editing, the method further comprising at least one of:
    determining to present one or more media files on the one or more devices;
    determining respective lengths of the one or more media files based, at least in part, on the location information, the movement, or a combination thereof;
    determining to cause, at least in part, a splicing or a separation of the one or more media files based, at least in part, on the location information, the movement, or a combination thereof;
    determining to edit the one or more media files to include text, still images, audio, transitions effects, or a combination thereof based, at least in part, on the location information, the movement, or a combination thereof;
    determining to combine the one or more media files as tracks of a final media file based, at least in part, on the location information, the movement, or a combination thereof; and
    determining to associate a media effect with at least one of the devices, wherein the media effect is applied on the one or more media files based, at least in part, on the location information, the movement, or a combination thereof.

6. A method of claim 1, wherein the one or more applications, the one or more services, or a combination thereof include media playback, the method further comprising at least one of:
    determining to playback one or more media files on a first one of the devices and a second one or more of the devices, wherein the playback of the media files on the second ones of the devices is delayed with respect to the playback of the media files on the first one of the devices, and wherein the delay is based, at least in part, on the location information, the movement, or a combination thereof;
    determining to control the playback of the one or more media files on the first one of the devices, the second ones of the devices, or a combination thereof based, at least in part, on the location information, the movement, or a combination thereof;

determining to replay at least a portion of the media files currently playing on the first one of the devices or the second ones of the devices based, at least in part, on the location information, the movement, or a combination thereof; and determining to detect an eye movement of a user associated with one of the devices, wherein the eye movement selects the first one of the devices from among the devices.

7. A method of claim 1, wherein the one or more applications, the one or more services, or a combination thereof include image processing, the method further comprising at least one of:

determining to compile a collage of images presented respectively on the one or more devices based, at least in part, on the location information, the movement, or a combination thereof;

determining a level of image processing to apply on the respective images based, at least in part, on the location information, the movement, or a combination thereof; and determining to define a perspective of at least one of the images based, at least in part, on the location information, the movement, or a combination thereof.

8. A method of claim 1, wherein the one or more applications, the one or more services, or a combination thereof include social networking, the method further comprising at least one of:

determining to present a social graph for the respective one or more devices, wherein the social graphs are combined based, at least in part, on the location information, the movement, or a combination thereof;

determining to identify one or more common contacts of the combined social graph with respect to the one or more devices, wherein the common contacts are offered a common benefit;

determining to generate a recommendation for one or more new contacts based, at least in part, on the one or more common contacts;

receiving an input for specifying one or more contact criteria, wherein the combined social graph is searched according to the contact criteria;

determining to establish a communication session between the one or more devices based, at least in part, on the combined social graph, the location information, the movement, or a combination thereof;

determining to present descriptions of the relationship types in the combined social graph; and determining to present different portions of the combined social graph on the one or more devices based on, at least in part, the location information, the movement, or a combination thereof.

9. A method of claim 1, further comprising:

determining to associate the one or more devices with a virtual controller corresponding to a function common to the one or more devices based, at least in part, on the location information, the movement, or a combination thereof;

receiving an input for actuating the virtual controller;

determining to control the function with respect to a local implementation of the function and one or more remote implementations of the function corresponding respectively to the one or more devices.

10. A method of claim 1, further comprising:

determining to associate one or more different applications or one or more different services with one or more of the devices; and combining one or more features, one or more user interface elements, or a combination thereof of the one or more different applications, the one or more different services, or a combination thereof based, at least in part, on the location information, the movement, or a combination thereof.

11. A method of claim 10, further comprising:

determining to present the one or more applications, the one or more different applications, the one or more services, the one or more different services, or a combination thereof on a plurality of layers of the virtual workspace; and determining to manipulate one or more of the plurality of layers based, at least in part, on the movement.

12. A method of claim 11, wherein the plurality of layers, or one or more portions of the one or more layers are associated respectively with different levels of access, different levels of control, or a combination thereof with respect to the devices.

13. An apparatus comprising:

at least one processor; and at least one memory including computer program code for one or more computer programs, the at least one memory and the computer program code configured to, with the at least one processor, cause the apparatus to perform at least the following, determine to detect location information associated with a plurality of devices;

determine to monitor movement of one or more of the devices relative to one or more other devices of the plurality of devices;

determine to create a virtual workspace represented by the movement and/or the location information of the plurality of devices, wherein the virtual workspace corresponds to one or more applications, one or more services, or a combination thereof common to the plurality of devices; and determine to cause, at least in part, a sharing of data from at least one of the devices based, at least in part, on the movement and/or the location information of the plurality of devices.

14. An apparatus of claim 13, wherein the apparatus is further caused to:

determine to combine the shared data and data from at least one other of the devices based, at least in part, on the location information, the movement, or a combination thereof; and determine to cause, at least in part, a translation of one or more modifications to the combined data at a topmost device of the stack to another device of the stack.

15. An apparatus of claim 13, wherein the apparatus is further caused to:

receive a request to store state information associated with the devices, the virtual workspace, the one or more applications, the one or more services, or a combination thereof;

determine the state information based, at least in part, on the location information, the movement, or a combination thereof; and determine to store the state information, wherein the state information enables restoration of the virtual workspace.

16. An apparatus of claim 13, wherein the movement of the one or more devices includes a movement along a plane of the virtual workplace, a movement in or out of the plane of the virtual workplace, a rotation of the one or more devices, a stacking of the one or more devices, an alignment of the one or more devices, or a combination thereof.

17. An apparatus of claim 13, wherein the one or more applications or the one or more services include media editing, and wherein the apparatus is further caused to perform at least one of:
- determine to present one or more media files on the one or more devices;
- determine respective lengths of the one or more media files based, at least in part, on the location information, the movement, or a combination thereof;
- determine to cause, at least in part, a splicing or a separation of the one or more media files based, at least in part, on the location information, the movement, or a combination thereof;
- determine to edit the one or more media files to include text, still images, audio, transitions effects, or a combination thereof based, at least in part, on the location information, the movement, or a combination thereof;
- determine to combine the one or more media files as tracks of a final media file based, at least in part, on the location information, the movement, or a combination thereof; and
- determine to associate a media effect with at least one of the devices, wherein the media effect is applied on the one or more media files based, at least in part, on the location information, the movement, or a combination thereof.

18. An apparatus of claim 13, wherein the one or more applications, the one or more services, or a combination thereof include media playback, and wherein the apparatus is further caused to perform at least one of:
- determine to playback one or more media files on a first one of the devices and a second one or more of the devices, wherein the playback of the media files on the second ones of the devices is delayed with respect to the playback of the media files on the first one of the devices, and wherein the delay is based, at least in part, on the location information, the movement, or a combination thereof;
- determine to control the playback of the one or more media files on the first one of the devices, the second ones of the devices, or a combination thereof based, at least in part, on the location information, the movement, or a combination thereof;
- determine to replay at least a portion of the media files currently playing on the first one of the devices or the second ones of the devices based, at least in part, on the location information, the movement, or a combination thereof; and
- determine to detect an eye movement of a user associated with one of the devices, wherein the eye movement selects the first one of the devices from among the devices.

19. An apparatus of claim 13, wherein the one or more applications, the one or more services, or a combination thereof include image processing, and wherein the apparatus is further caused to perform at least one of:
- determine to compile a collage of images presented respectively on the one or more devices based, at least in part, on the location information, the movement, or a combination thereof;
- determine a level of image processing to apply on the respective images based, at least in part, on the location information, the movement, or a combination thereof; and
- determine to define a perspective of at least one of the images based, at least in part, on the location information, the movement, or a combination thereof.

20. An apparatus of claim 13, wherein the one or more applications, the one or more services, or a combination thereof include social networking, and wherein the apparatus is further caused to perform at least one of:
- determine to present a social graph for the respective one or more devices, wherein the social graphs are combined based, at least in part, on the location information, the movement, or a combination thereof;
- determine to identify one or more common contacts of the combined social graph with respect to the one or more devices, wherein the common contacts are offered a common benefit;
- determine to generate a recommendation for one or more new contacts based, at least in part, on the one or more common contacts;
- receive an input for specifying one or more contact criteria, wherein the combined social graph is searched according to the contact criteria;
- determine to establish a communication session between the one or more devices based, at least in part, on the combined social graph, the location information, the movement, or a combination thereof;
- determine to present descriptions of the relationship types in the combined social graph; and
- determine to present different portions of the combined social graph on the one or more devices based on, at least in part, the location information, the movement, or a combination thereof.

* * * * *